US012792796B2

(12) United States Patent
Rey

(10) Patent No.: US 12,792,796 B2
(45) **Date of Patent: *Nov. 10, 2026**

(54) DATA DRIVEN MODELING OF A ROUGH SURFACE FOR SHOOTING AND BOUNCING RAYS

(71) Applicant: ANSYS, INC., Canonsburg, PA (US)

(72) Inventor: Daniel Rey, Evanston, IL (US)

(73) Assignee: ANSYS, INC., Canonsburg, PA (US)

( * ) Notice: Subject to any disclaimer, the term of this patent is extended or adjusted under 35 U.S.C. 154(b) by 1077 days.

This patent is subject to a terminal disclaimer.

(21) Appl. No.: 17/687,300

(22) Filed: Mar. 4, 2022

(65) Prior Publication Data

US 2023/0113723 A1 Apr. 13, 2023

Related U.S. Application Data

(60) Provisional application No. 63/254,769, filed on Oct. 12, 2021.

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC .... G06F 30/20; G06F 2111/10; G06F 30/367; G06F 30/23
See application file for complete search history.

(56) References Cited

U.S. PATENT DOCUMENTS 4,548,506 A * 10/1985 Elson .................. G01B 11/303 356/446
6,114,985 A * 9/2000 Russell ................. G01S 7/4052 342/173

(Continued)

FOREIGN PATENT DOCUMENTS

CN 101216556 B * 7/2011
CN 112861324 A * 5/2021 ............. G06F 17/15
CN 112711888 B * 10/2022 ............. G06F 30/23

OTHER PUBLICATIONS

L. Tsang et al., "Electromagnetic Computation in Scattering of Electromagnetic Waves by Random Rough Surface and Dense Media in Microwave Remote Sensing of Land Surfaces," in Proceedings of the IEEE, vol. 101, No. 2, pp. 255-279, Feb. 2013, doi: 10.1109/JPROC.2012.2214011 (Year: 2013).*

(Continued)

*Primary Examiner* — Emerson C Puente
*Assistant Examiner* — Yi Hao
(74) *Attorney, Agent, or Firm* — WOMBLE BOND DICKINSON (US) LLP

(57) ABSTRACT

A method is disclosed for adapting the shooting and bouncing rays (SBR) model used in EM field simulation to incorporate incoherent effects of rough surfaces. It introduces a data-driven framework that utilizes on an ensemble of bistatic polarized RCS measurements to characterize the aggregate coherent and incoherent scattering contributions from microscopic surface roughness by compiling field statistics into bidirectional scattering distribution functions (BSDFs). It generalizes an analytical model for rough surface microwave scattering with no assumptions made on surface statistics. The method includes a technique for computing properly correlated fluctuations in the incoherent field across frequency and incident/observation angle. The technique exploits the scale invariance of the incoherent (Continued)

fluctuations to adapt these fluctuations to ray footprints with arbitrary size with the size of the sample surface. The sampling method accurately reproduces the statistical distribution of scattered fields observed from direct simulation of rough surfaces where microscopic roughness is explicitly modeled.

23 Claims, 13 Drawing Sheets

(56) References Cited

U.S. PATENT DOCUMENTS

| | | | | |
|---|---|---|---|---|
| 6,580,388 | B1 * | 6/2003 | Stoyanov | G01S 7/411 342/195 |
| 7,424,408 | B1 * | 9/2008 | Crabtree | G01S 7/4052 703/2 |
| 8,242,952 | B1 * | 8/2012 | Barr | G01S 7/412 342/55 |
| 2003/0167156 | A1 * | 9/2003 | Alba | G06F 30/20 703/2 |
| 2005/0206890 | A1 * | 9/2005 | Hurst | G06T 7/62 356/239.7 |
| 2006/0285640 | A1 * | 12/2006 | Nizin | G06F 30/00 378/65 |
| 2010/0066592 | A1 * | 3/2010 | Lee | G01S 7/4021 342/175 |
| 2010/0066595 | A1 * | 3/2010 | Lee | G01S 7/412 342/179 |
| 2010/0109941 | A1 * | 5/2010 | Vacus | G01S 7/41 342/179 |
| 2013/0208850 | A1 * | 8/2013 | Schmitt | G01N 23/203 378/4 |
| 2017/0363719 | A1 * | 12/2017 | Ahmed | G01S 7/4052 |
| 2019/0339318 | A1 * | 11/2019 | Liu | G01R 29/08 |
| 2019/0355601 | A1 * | 11/2019 | Danen | G02B 27/0012 |
| 2020/0158855 | A1 * | 5/2020 | Blanche | G01S 13/9011 |
| 2020/0349306 | A1 * | 11/2020 | Bruno | G16C 20/00 |
| 2021/0350044 | A1 | 11/2021 | Rey et al. | |

OTHER PUBLICATIONS

R. Fercher et al., "Image formation by inversion of scattered field data: experiments and computational simulation," Applied optics, vol. 18, No. 14, pp. 2427-2439, Jul. 1979, doi: 10.1364/AO.18.002427 (Year: 1979).*

A. M. Marzougui et al., "Scattering from rough surfaces using the 'shooting and bouncing rays' (SBR) technique and comparison with the method of moments solutions," International Symposium on Antennas and Propagation Society, Merging Technologies for the 90's, Dallas, TX, USA, 1990, pp. 1540-1543 (Year: 1990).*

A. Dusséaux et al., "Statistical distribution of field scattered by one-dimensional random slightly rough surfaces," Progress in Electromagnetics Research Symposium, Mar. 26-29, 2006, 2 (3), pp. 227-231 (Year: 2006).*

M. Bielawny, "Modeling Custom Surface Roughness with LucidShape 2D Scatter Curve BSDF Material," Synopsys Optical Solutions Group, Feb. 2019 (Year: 2019).*

C. Yang, "Depolarized Backscattering of Rough Surface by AIEM Model," IEEE Journal of Selected Topics in Applied Earth Observations and Remote Sensing, vol. 10, Issue: 11, Nov. 2017, DOI: 10.1109/JSTARS.2017.2763631 (Year: 2017).*

R. de Roo, "Bistatic Specular Scattering from Rough Dielectric Surfaces," IEEE Transactions on Antennas and Propagation, vol. 42, Issue: 2, Feb. 1994, DOI: 10.1109/8.277216 (Year: 1994).*

E. I. Thorsos, "The validity of the Kirchhoff approximation for rough surface scattering using a Gaussian roughness spectrum," J. Acoust. Soc. Am. Jan. 1, 1988; 83 (1): 78-92. doi.org/10.1121/1.396188 (Year: 1988).*

Rui Wang, Guangbin Guo, Lixin Guo, "Study of the Terahertz Wave Scattering From Metal Surface Coated by Rough Lossy Coating Based on a Ray Tracing Modeling", IEEE Access, vol. 7, pp. 116799-116808, 2019. (Year: 2019).*

W. Gao, Z. Liang, J. Fang and Y. Liao, "Non-uniform triangulation technique in the shooting and bouncing ray method," 2013 5th IEEE International Symposium on Microwave, Antenna, Propagation and EMC Technologies for Wireless Communications, Chengdu, China, 2013, pp. 272-274 (Year: 2013).*

D. L. Setterdahl, R. A. Kipp and M. C. Miller, "Signa: A radar signature prediction tool for electrically large targets," 2014 IEEE Radar Conference, Cincinnati, OH, USA, 2014, pp. 0083-0087, doi: 10.1109/RADAR.2014.6875560. (Year: 2014).*

R. L. Wagner, Jiming Song and W. C. Chew, "Monte Carlo simulation of electromagnetic scattering from two-dimensional random rough surfaces," in IEEE Transactions on Antennas and Propagation, vol. 45, No. 2, pp. 235-245, Feb. 1997, doi: 10.1109/8.560342 (Year: 1997).*

J. T. Johnson and R. J. Burkholder, "A study of scattering from an object below a rough surface," in IEEE Transactions on Geoscience and Remote Sensing, vol. 42, No. 1, pp. 59-66, Jan. 2004 (Year: 2004).*

H. J. Mametsa, A. Bergès and N. Douchin, "Improving RCS and ISAR image prediction of terrestrial targets using random surface texture," 2009 International Radar Conference "Surveillance for a Safer World" (Radar 2009), Bordeaux, France, 2009, pp. 1-5 (Year: 2009).*

B. Zhao et al., "Scattering Characteristics of Targets above a Rough Surface in SAR Images," International Journal of Antennas and Propagation vol. 2013, Article ID 653438, 10 pages http://dx.doi.org/10.1155/2013/653438 (Year: 2013).*

W. J. Ji et al., "Radar Image of One Dimension Rough Surface With Buried Object," Progress in Electromagnetics Research B, vol. 36, 323-336, 2012 (Year: 2012).*

X.Y. He et al., "Fast ISAR Image Simulation of Targets at Arbitrary Aspect Angles Using a Novel SBR Method," Progress In Electromagnetics Research B, vol. 28, 129-142, 2011. (Year: 2011).*

Harvey, James E., et al., "Modified Beckmann-Kirchhoff scattering model for rough surfaces with large incident and scattering angles," Optical Engineering 46(7), 078002, Jul. 2007, 11 pages.

Fung, Adrian K., et al., "An Update on the IEM Surface Backscattering Model," IEEE Geoscience and Remote Sensing Letters, vol. 1, No. 2, Apr. 2004, pp. 75-77.

Li, E. S., & Sarabandi, K. (1999). Low grazing incidence millimeter-wave scattering models and measurements for various road surfaces. IEEE Transactions on Antennas and Propagation, 47(5), 851-861.

De Roo, Roger D., and Fawwaz T. Ulaby. "Bistatic specular scattering from rough dielectric surfaces." IEEE Transactions on Antennas and Propagation 42.2 (1994): 220-231.

Yang, Ying, et al. "Depolarized backscattering of rough surface by AIEM model." IEEE Journal of Selected Topics in Applied Earth Observations and Remote Sensing 10.11 (2017): 4740-4752.

* cited by examiner

500

DATA DRIVEN MODELING OF A ROUGH SURFACE FOR SHOOTING AND BOUNCING RAYS

CROSS REFERENCE TO RELATED APPLICATIONS

This application claims the benefit of U.S. Provisional Application No. 63/254,769 filed on Oct. 12, 2021, the disclosure of which is incorporated herein by reference in its entirety.

BACKGROUND

The growing popularity of portable low-power radio-frequency (RF) electronic devices has increased the demand for practical electromagnetic (EM) simulation tools, which model the scattering effects from objects in a large complex environment on fields emanating from one or more transmitting antennas. Such tools predict the observed EM fields at various spatial locations, as well the coupled signal (i.e. voltage response) at one or more receiving antennas. They may be used to model a broad spectrum of applications including: range Doppler radars, inverse synthetic aperture radars (ISAR), frequency modulation continuous-wave (FMCW) radars, etc.

One common EM simulation technique specifically designed to solve large-scale problems involving complex 3D geometries is known as Shooting and Bouncing Rays (SBR). The SBR methodology is based on ray-tracing, which makes it particularly well-suited for large-scale problems such as modeling indoor/outdoor fifth-generation (5G) wireless propagation, or for a variety of target ranging detection and identification tasks, which are now routinely performed by autonomous vehicles. Conventional SBR however, has a key limitation in that it considers only coherent scattering effects. That is, it assumes all surfaces may be treated as electrically smooth, so any surface height fluctuations are assumed to be much smaller than the wavelength $\lambda$ associated with the highest simulation frequency and can be ignored. However, as the operational frequency of RF devices increases, the modeling of surface roughness effects becomes crucial. For instance, a typical 77 GHz radar has a wavelength of roughly four millimeters, which is of the same order of magnitude as the surface height fluctuations present in roads, buildings, terrain, etc. Under these conditions, such surfaces cannot be considered smooth, as they no longer reflect the EM wave coherently, like a mirror. Rather, the scattered field or energy consists of a specular coherent component and a diffuse incoherent component. Accurate simulation requires properly modeling the effects of the surface roughness—ignoring them would be tantamount to assuming pavement can be modeled as a thick sheet of mirrored glass.

Addressing these limitations requires augmenting the SBR methodology with a rough surface scattering model. While SBR can explicitly model the scattering effects due to rough surfaces down to the millimeter scale, such as by modeling the microscopic surface details in the input 3D geometry, this solution is computationally impractical for large simulation environments, which may span thousands of meters (millions of wavelengths). Alternatively, existing rough surface scattering models may make assumptions about the statistical distributions of surface heights and the correlation length of the surface height fluctuations of the rough surface. These assumptions, although valid under certain conditions, may be too restrictive and do not adequately represent the surface micro-geometry (e.g., for surfaces that are not height-fields). They may also introduce approximations that result in deviations of the scattered fields from those obtained by SBR using explicitly modeled surface roughness. For example, the angular dependence of the Fresnel surface reflection/transmission coefficients is typically ignored, which leads to poor accuracy at grazing and Brewster's angles. Self-shadowing and masking effects, when considered, are often assumed to have a certain functional form. It is desirable to improve the accuracy and efficiency of modeling rough surface scattering effects for use with the SBR methodology, in a way that adequately captures the diversity of surface micro-geometry encountered in the real world.

SUMMARY

The techniques described herein adapt the coherent scattering methodology of SBR to incorporate incoherent effects of rough surfaces. The embodiments represent a generalization of the embodiments of the analytical model described in U.S. patent application Ser. No. 16/869,508 filed on May 7, 2020 by Applicant Ansys, Inc., and this prior patent application is incorporated herein by reference. The techniques described herein combine models, based on field statistics, of the coherent (specular reflected and possibly transmitted) and incoherent (diffuse) scattered fields due to surface roughness to accurately reproduce the statistical distribution of scattered fields observed from direct SBR simulation using explicitly rendered rough surfaces. In other words, the total scattered field, generated from the coherent sum of the coherent and the incoherent components of the scattered field, which are modeled based on the statistical characteristics of the surface roughness, is statistically consistent with results obtained from direct SBR simulation, where the microscopic geometry of surface roughness is explicitly modeled.

Aspects of the techniques introduce a data-driven framework that utilizes an ensemble of bistatic polarized radar cross-section (RCS) measurements to characterize the aggregate coherent and incoherent scattering contributions from microscopic surface roughness by compiling field statistics into a bidirectional scattering distribution function (BSDF). This approach is an improvement over existing models for rough surface microwave scattering, which have several notable deficiencies due to assumptions (e.g., on the statistical distribution of rough surface micro-geometry) that are not valid in general.

The model for the incoherent field includes both amplitude and phase for compatibility with SBR. In SBR, the incident EM wave from a radiation source may be modeled as an ensemble of volumetric ray-tubes that transport the EM field from the radiation source to a scene object. Each ray-tube has a finite two-dimensional cross-section perpendicular to the ray travel direction. When a ray of the EM field obliquely hits a surface, the ray-tube cross-section intersects the surface over a range of ray travel distances, resulting in a projected area and shape on the surface that matches that of the ray-tube cross-section. The fields on the rough surface may be modeled by considering the projected footprints of these ray-tubes on the surface, also known as ray-tube footprints. The incoherent field for each projected ray-tube footprint is modulated by a random amplitude and phase in such a way that the average incoherent field power of each projected ray-tube footprint scales linearly with its area (i.e., the average field magnitude scales with the square root of the area), and that the distribution of incoherent field power is independent of the density of rays illuminating the ray-tube footprints. These properties are required for the model to be self-consistent: the distribution of scattered fields should not depend on the number of rays illuminating the target.

Aspects of the techniques introduce a model for computing properly correlated fluctuations in the incoherent field across frequency, footprint size, and incident/observation angle. The technique exploits the scale invariance of the incoherent fluctuations to adapt these fluctuations for ray footprints with arbitrary size to the size of the sample surface used to generate the ensemble of RCS measurements. The sampling method accurately reproduces the statistical distribution of scattered fields observed from direct simulation of rough surfaces where microscopic roughness is explicitly modeled.

In one embodiment, a method for computer-aided simulation of EM field scattered by a rough surface model is disclosed. The method includes calculating the coherent component of the scattered field due to the EM field incident on the surface of an object based on statistics computed from an ensemble of recorded measurements of field scattered by the rough surface of the object. The method also includes calculating the incoherent component of the scattered field due to the EM field based on statistics computed from the ensemble of recorded field measurements scattered by the rough surface of the object. The method further includes coherently summing the coherent component and the incoherent component to generate the aggregate scattered field from the rough surface of the object. The aggregate scattered field is statistically consistent with results obtained from explicitly modeling the rough surface. The method further includes optionally processing the aggregate scattered field to represent an imagery of the object.

In one embodiment, a method is disclosed to compile an ensemble of bistatic radar cross-section (RCS) measurements recorded from scattering off small sections of rough surface into bidirectional scattering distribution functions (BSDFs) for the coherent field magnitude, incoherent field magnitude and the incoherent field phase. These BSDFs are used to compute the contributions from the coherent component and the incoherent component of the field scattered by the rough surface. The method includes generating an ensemble of instantiations of an explicit rough surface model to represent the surface roughness. Each member or instantiation of the ensemble may represent a distinct representation of the geometric and electromagnetic description of the microscopic roughness of the surface. In one aspect, the ensemble of bistatic RCS measurements may be obtained experimentally. However, if this is impractical or cost prohibitive, the bistatic RCS measurements may be obtained from simulation of the ensemble of instantiations of the explicit rough surface model.

The method also includes computing an ensemble of bistatic RCS measurements as a function of the four polarizations $(\hat{v}\hat{v},\hat{v}\hat{h},\hat{h}\hat{v},\hat{h}\hat{h})$ of observed/incident fields across a range of incident and observation directions for a simulation frequency of interest based on the ensemble of instantiations of the explicit rough surface model and electrical properties of the surface material. The method further includes computing the mean field BSDF used to model the magnitude of the coherent scattered field as a function of the four polarizations of incident/observed fields and the incident/observation directions based on the mean of the ensemble of bistatic RCS measurements. The method further includes computing the variance field BSDF used to model the magnitude of the incoherent scattered field as a function of the four polarizations of incident/observed fields and the incident/observation directions based on the variance of the ensemble of bistatic RCS measurements.

The method further includes computing an additional BSDF used to model the random phase of the incoherent scattered field across the range of incident/observation directions based on the mean and the variance of the ensemble of bistatic RCS measurements. This "incoherent phase" BSDF may represent normalized fluctuations of the incoherent scattered field. It may be computed by taking a member from the ensemble of bistatic RCS measurements, subtracting the mean (coherent) component derived from the mean field BSDF, and normalizing by the standard deviation (incoherent) component derived from the variance field BSDF. Alternatively, instead of relying on the statistics of the bistatic RCS measurements, the method may use an analytical approach to compute directly the BSDF representing the normalized fluctuations of the incoherent scattered field. The result characterizes the fluctuations of the incoherent field, which are correlated across frequency and incident/scattering angle.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
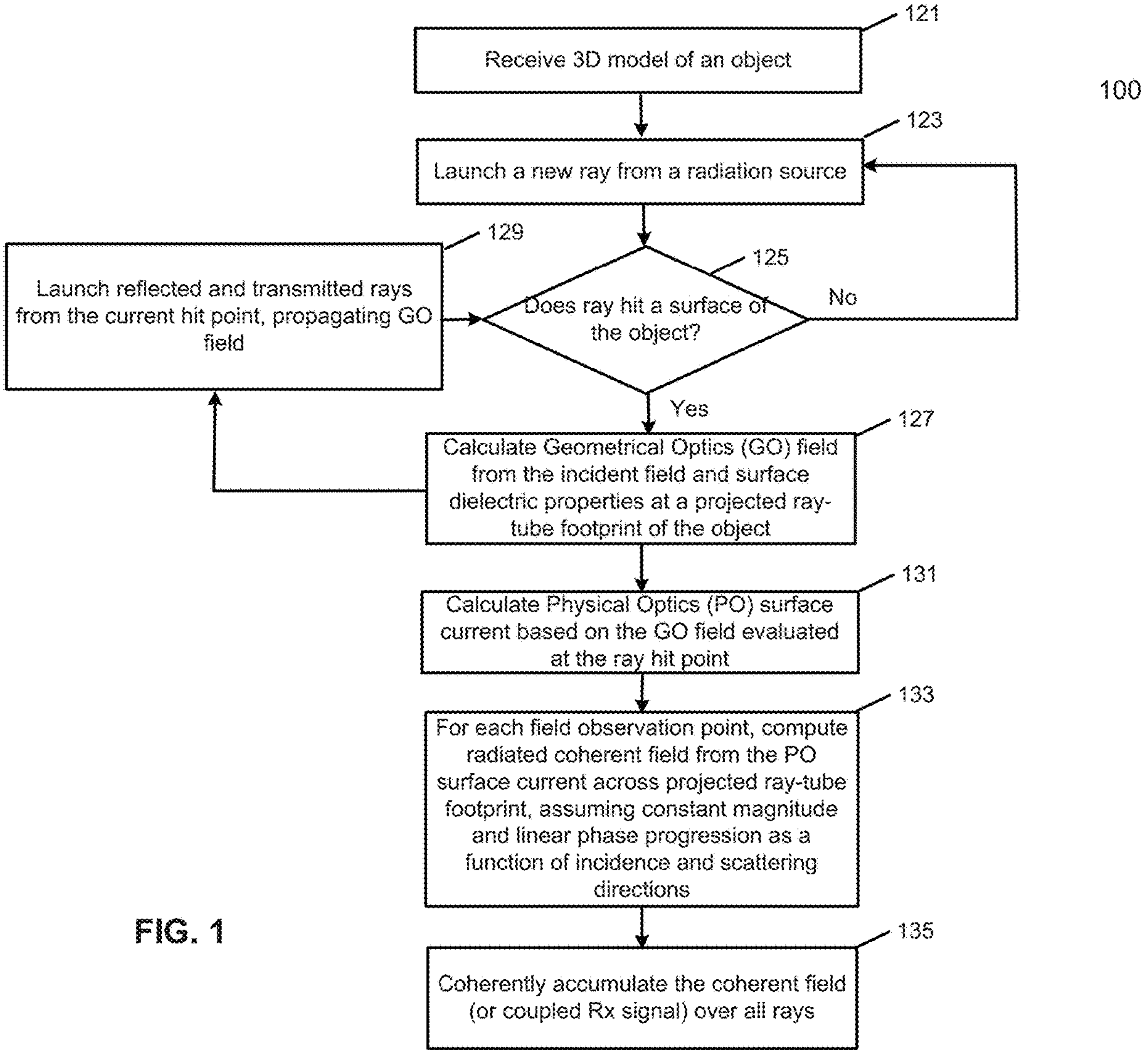
FIG. 1 illustrates a flow diagram of a method to use the SBR technique on a non-rough surface.

A technique is disclosed to augment the SBR methodology for EM field simulation to include surface roughness effects on field scattering. The SBR methodology is an asymptotic technique for predicting the scattering response of radio waves in real-world environments. The method, which uses ray-tracing to transport energy from electromagnetic sources to observation points by simulating the interaction with scene elements through a combination of the physical optics and geometric optics approximations, is however limited to phase coherent contributions from surfaces that are either flat or slightly curved relative to the simulation wavelength. This assumption, while often suitable for scenarios below say 10 GHz where the wavelength is on the order of centimeters, is inappropriate for higher frequency millimeter-wave applications such as automotive radar and 5G wireless communication in environments where the fluctuations in height due to roughness in surfaces such as road asphalt or concrete buildings often exceed a signification fraction of the simulation wavelength. The effects of surface roughness on high-frequency (1-100 GHz) radio waves may include frequency-dependent attenuation or enhancement of coherent scattered fields, and the transfer of energy from the specular reflected beam to a diffuse incoherent component that has a random phase.

To accurately simulate rough surfaces with height fluctuations comparable to the smallest simulation wavelength, SBR may be augmented to model the scattered field due to surface roughness. The SBR model may be augmented to statistically characterize parameters of the surface roughness such as the standard deviation $\sigma$ and the correlation length $\ell$. The $\sigma$ may represent the root-mean-squared (RMS) deviation of surface height from being perfectly smooth. The $\ell$ may represent a parameterized value of the autocorrelation function of the surface height fluctuations across a horizontal length of the surface. The SBR model may make some assumptions on the statistical distribution of these roughness parameters. To improve the modeling efficiency, the augmented SBR model may make further assumptions on the self-shadowing and masking effects that may not accurately model the scattered fields at grazing incident angles or Brewster's angles. These assumptions, although valid under certain conditions, may fail to provide the generality desired for adapting a general-purpose tool like SBR.

Disclosed are techniques to generalize the SBR methodology to model the coherent component and the diffuse incoherent component of the scattered field from surface roughness in a way that is statistically accurate, memory efficient, and computationally practical to permit fast simulation (i.e., without the need to explicitly instantiate the surface roughness). The techniques make no assumptions on the statistics of the surface roughness. Inspired in part by the success of data-driven modeling for digital rendering of rough surface scattering from the visible spectrum, the techniques take as input an ensemble of bistatic radar cross-section (RCS) measurements recorded from small sections of rough surface across the full range of incident/observation angles, polarization and frequencies of interest. Such measurements may be obtained experimentally, or from direct simulation of small sections of rough surface where microscopic roughness is explicitly modeled. Statistics may be computed on the ensemble to separate the scattering response into its coherent and incoherent field components, which correspond respectively to the ensemble mean and standard deviation. The results may be compiled into a bidirectional scattering distribution functions (BSDFs). These functions may serve as lookup tables to compute the scattered field contributions from the coherent field and incoherent field magnitudes for each ray in the SBR simulation.

Aspects of the disclosed techniques may compute a random incoherent phase to modulate the incoherent field magnitudes, which is absent from the standard deviation calculation (it is real by definition). Phase information is required for incorporation into the coherent scattering methodology of SBR. Although inherently random, the incoherent response may be modeled to exhibit the proper statistics. In particular, it may have the proper correlation across the following dimensions: 1) frequency, 2) footprint size, and 3) incident/scattering angles so that the distribution of the incoherent power is independent of the density of rays illuminating the surface, which is a simulation parameter that should not impact the physics of the scattered field. The techniques may introduce an additional BSDF for incoherent phase that may isolate the fluctuations in the incoherent field by normalizing the ensemble by its mean and standard deviation. This BSDF for the incoherent phase may then be sampled during the SBR simulation. However, because these fluctuations are inherently tied to the specific geometry of the rough surface samples used to generate the ensemble measurements, it is desirable to generalize the BSDF sampling procedure to adapt the incoherent phase to an arbitrary ray-tube footprint geometry so it may be incorporated into SBR.

Aspects of the disclosed techniques adapt the incoherent phase BSDF for arbitrary ray-tube footprint geometry based on the insight that the correlations of the incoherent field exhibit scale-invariant symmetry that scales with the footprint size. This scale invariance property may be exploited during simulation by interpolating the incoherent phase BSDF in a specific way that exhibits the proper incoherent field correlations for an arbitrary ray-tube footprint geometry. The incoherent phase BSDF may also be interpolated over frequencies and incident angles for a ray-tube footprint through scaling and translation, respectively, to maintain the correlations of the incoherent response across frequencies and incident/scattering angles. Results demonstrate that sampling the incoherent phase in this way produces an incoherent field whose mean and variance are independent of the simulation ray density of the ray-tube footprints and the distribution of incoherent field power closely matches results obtained from direct simulation of a microscopic description of the rough surface.

Before describing the adaptation of the SBR methodology for rough surfaces, it is useful to first summarize the SBR methodology as it applies to flat (i.e. non-rough) surfaces. The SBR algorithm may take as inputs:

1. A 3D geometry of the scene to be simulated, typically modeled as a triangle mesh.

2. A set of frequencies at which to simulate, typically in the microwave or millimeter wave range 100 MHz-100 GHz.

3. A table of Fresnel reflection and transmission coefficients characterizing the EM properties of each material in the simulation and evaluated at said frequencies for all incident angles 0-90 degrees.

4. A set of excitations (e.g., antenna models or plane waves), which provide incident E and H fields as a function of direction and frequency.

5. A collection of observations upon which the scattered field should be accumulated, usually near-field points, far-field angles, or models for receiver antennas.

The SBR algorithm may produce as outputs, estimates of the scattered field or coupled receiver signal at each simulation frequency of input (2) and each observation of input (5).

FIG. 1 illustrates a flow diagram of a method 100 to use the SBR technique on a non-rough surface. In operation 121, a 3D CAD model of an object is received by the method 100. In one embodiment, the 3D CAD model of an object may include the EM properties such as the electric permittivities and magnetic permeabilities of the object's surface materials.

Figure 2:
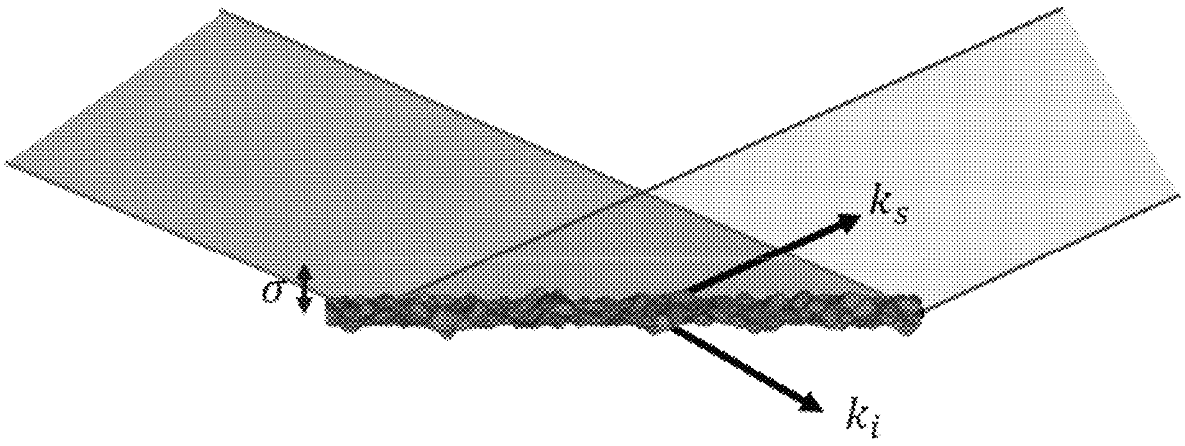
FIG. 2 illustrates in profile the incident and reflected volumetric ray-tubes projected on a rough surface whose microfacet geometry has been explicitly modeled.

In operation 123, a new volumetric ray-tube is launched from a radiation source, such as a transmitting antenna or plane wave. In operation 125, it is determined whether the ray launched in operation 123 hits a surface of the object model. If the ray hits a surface, the volumetric ray-tube is projected onto the object surface by computing its projected ray-tube footprint. FIG. 2 illustrates in profile the incident and reflected volumetric ray-tubes projected onto a rough surface whose microgeometry has been explicitly modeled in accordance with one embodiment of the disclosure. If no surface is hit, the method 100 returns to operation 123 to launch an additional ray until all rays are exhausted. In one embodiment, operation 123 may launch a plurality of volumetric ray-tubes and the associated rays from the radiation source. The plurality of volumetric ray-tubes may project a plurality of ray-tube footprints onto the object surface.

If a ray hits a surface of the object, operation 127 calculates the incident, reflected and transmitted (for penetrable materials) geometrical-optics (GO) fields on the surface of the projected ray-tube footprint. In one embodiment, the incident, reflected and transmitted GO fields are computed at the ray hit point associated with the projected ray-tube footprint that is generated from the ray launched from the radiation source. In basic SBR, Fresnel coefficients provide a way of mapping the incident field to its reflected and transmitted field components, which in turn allows one to determine equivalent surface currents under the PO approximation. These coefficients effectively characterize the electromagnetic properties of each material in the scene at each simulation frequency of interest.

In operation 129, the coherent component of the reflected and transmitted GO fields calculated in operation 127 is used to launch and trace new rays in the reflected and transmitted directions from the projected ray-tube footprint according to Snell's law. In operation 125, it is determined if the new ray hits a new surface of the object. If a new ray hits a surface of the object, the method 100 returns to operation 127 to propagate the GO reflected and possibly transmitted field to the ray hit point on that hit surface. Operations 127, 129, and 125 may be repeated to compute and propagate the reflected and transmitted rays from the new projected ray-tube footprint.

In operation 131, the method 100 calculates equivalent electric and magnetic currents of the projected ray-tube footprint from the GO fields according to the physical-optics (PO) approximation and the EM properties of the object's surface materials.

In operation 133, for each field observation point, a coherent component of the scattered field radiated by the equivalent PO currents is calculated. In one embodiment, the radiated field is the integral of the PO current density over the area of the projected ray-tube footprint, assuming constant magnitude and linear phase progression that depends on the incidence and scattering directions.

In operation 135, the method 100 coherently accumulates the coherent scattered field (or coupled RF signal at a receiving antenna) across all rays over a plurality of projected ray-tube footprints.

To model the coherent component and the diffuse incoherent component of the scattered field from a rough surface, the SBR model may be augmented with a rough surface model as described in U.S. patent application Ser. No. 16/869,508 ('508 application), in which surface roughness may be characterized by statistical parameters such as the standard deviation σ of surface height and the correlation length € of surface height fluctuations by assuming specific statistical distributions of these roughness parameters. With these assumptions, analytic expressions for coherent field attenuation and incoherent field magnitudes may be derived.

For example, the attenuation of the coherent scattered field due to the surface roughness may be modeled with a scalar attenuation factor, which may be a function of the incident and scattered azimuth and polar angles, the wave number, roughness properties of the surface, and the EM properties of the surface materials. In the example, assuming Gaussian distribution of surface heights with standard deviation σ, the attenuation factor is given by the well-known expression:

$$\alpha \approx \exp\left(-\frac{1}{2}k^2\sigma^2\left(\hat{n}\cdot\left(\vec{k}^o - \vec{k}^i\right)\right)^2\right)$$

where k is the wavenumber, $\vec{k}^o$, $\vec{k}^i$ are the scattered/incident wave vectors, n̂ is the surface normal and σ is the standard deviation of surface heights. As described in the '508 application, the scalar attenuation factor is used to reduce the radiated field power of the coherent field component while preserving its coherent phase. The attenuated coherent reflected and transmitted geometrical-optics (GO) fields are then propagated by ray transport to the next bounce point, in accordance with the multi-bounce ray tracing framework of SBR.

A derived analytical expression for the polarized incoherent field magnitudes may be used to determine the scattered incoherent field magnitude for a given ray-tube footprint. This assumes that the footprint geometry is large relative to the scale of the rough micro-geometry, and therefore the geometry of the specific ray-tube footprint does not significantly impact the polarized incoherent field magnitudes. Specifically, let $|E(k,\vec{k}^i,\vec{k}^o,\vec{p}^i,\vec{p}^o)|$ be an expression for the incoherent magnitude as a function of the wavenumber k, the incident and scattered wave vectors $\vec{k}^i, \vec{k}^o$ and the incident/scattered polarizations $\vec{p}^i, \vec{p}^o$. Then the incident field $\vec{E}^{inc}$ at the ray hit point is mapped to the incoherent scattered field magnitude $|E^{ncoh}|$ by:

1. Decomposing the incident field $\vec{E}^{inc}$ into its incident polarization components $\vec{p}^i \in \{\vec{v}, \vec{h}\}$, which are expressed in the local coordinates of the projected ray-tube footprint;
2. Interpolating $|E|$ based on frequency and incident/observation direction $k, \vec{k}^i, \vec{k}^o$; and
3. Summing the result over the observed polarization $\vec{p}^o \in \{\vec{v}, \vec{h}\}$, also expressed in local coordinates of the ray-tube.

The incoherent scattered field magnitude $|E^{ncoh}|$ may therefore be expressed as:

$$|E^{noch}| = \sum_{\vec{p}^o \in \{\hat{v},\hat{h}\}} \sum_{\vec{p}^i \in \{\hat{v},\hat{h}\}} \left(\vec{E}^{inc} \cdot \vec{p}^i\right) \left| E\left(k, \vec{k}^i, \vec{k}^o, \vec{p}^i, \vec{p}^o\right) \right| \vec{p}^o$$

Although valid under certain conditions, typical assumptions on the statistical distribution of surface roughness (e.g., distribution of heights and spatial correlations for rough surface microgeometry) and the derived expressions for coherent field attenuation and incoherent field magnitude may introduce approximations that result in deviations of the scattered fields from those obtained by explicitly modeling the surface roughness. Aspects of the disclosed techniques generalize the analytical model to rely solely on scattered field statistics with no assumptions made on the statistics of the roughness. The generalized analytical model computes the scattered coherent and incoherent fields using BSDFs compiled from an ensemble mean and variance respectively of a set of bistatic RCS measurements recorded from sections of the rough surface across the full range of incident/observation angles, polarizations and frequencies of interest.

Let $E_n(k, \vec{k}^i, \vec{k}^o, \vec{p}^i, \vec{p}^o)$ denote the field scattered by the $n^{th}$ member of the rough surface model ensemble, observed along direction $\hat{k}_o$ in polarization $\hat{p}_o$ due to a plane wave of unit magnitude incident along direction $\hat{k}_i$ in polarization $\hat{p}_i$ at simulation frequency $f=2\pi/k$ (k is the wave number (i.e., angular frequency divided by speed of light)). To simplify the notation, the field dependencies are suppressed and we may write $E_n(k, \vec{k}^i, \vec{k}^o, \vec{p}^i, \vec{p}^o) \equiv E_n$ for $n=\{0, \ldots, N-1\}$ where N is the number of ensemble members. The RCS data may then be post-processed to generate the BSDF.

The mean field BSDF may be defined as the ratio $$\alpha \equiv \frac{|\bar{E}|}{|E_f|}$$

where $E_f$ is the scattered field for the flat plate and $$\bar{E} = \frac{1}{N} \sum_{i=0}^{N-1} E_n$$

is the mean field across the ensemble. The factor $\alpha$ is a scalar field attenuation/enhancement factor that depends on the field parameters $k, \vec{k}^i, \vec{k}^o, \vec{p}^i, \vec{p}^o$. Under certain conditions, this factor is well-approximated by the analytic form given by:

$$\alpha \approx \exp\left(-\frac{1}{2} k^2 \sigma^2 \left(\hat{n} \cdot \left(\vec{k}^o - \vec{k}^i\right)\right)^2\right)$$

where $\hat{n}$ is the surface normal pointing towards the incident ray and $\sigma$ is the standard deviation of surface heights. The variance field BSDF may be defined by $$|E|^2 = \frac{1}{N} \sum_{i=0}^{N-1} |E_n - \bar{E}|^2.$$

This BSDF determines the magnitudes of incoherent scattered field in each of four states $\hat{v}\hat{v}, \hat{v}\hat{h}, \hat{h}\hat{v}, \hat{h}\hat{h}$: where OI represents observed field in polarization O due to incident field in polarization I.

In principle, these data can be obtained by either experiment or numerical simulation. However, in practice such high-resolution bistatic RCS data are difficult to find in the microwave frequency range, as the experimental setups are cost prohibitive. Direct simulation, on the other hand, may need (in addition to an electromagnetic solver) geometric and electromagnetic descriptions of the microscopic roughness of the surface. This rough micro-geometry may be described statistically, often involves assuming some distribution of surface heights (typically Gaussian with mean 0 and standard deviation $\sigma$), as well as a correlation function and correlation length parameter $\ell$.

In one embodiment, a Gaussian distribution is chosen for both the standard deviation of surface heights and the correlations. With these assumptions, the surface micro-geometry are characterized by the choice of $\sigma$ and $\ell$. An instantiation of the micro-geometry may be obtained by a filtering operation, in which a set of random numbers $z_{ij}$ are chosen from a Gaussian distribution $N(0, \sigma^2)$ with mean 0 and standard deviation $\sigma$. Each $z_{ij}$ corresponds to values on a uniform rectangular grid of size $(L_x, L_y)$ and $(N_x, N_y)$ samples, with values $$x_i = idx - \text{floor}\left(\frac{N_x}{2}\right) dx = \frac{L_x}{N_x - 1}$$

and $i=\{0, 1, \ldots, N_x 0\ 1\}$, and similar expressions defined for $y_j$. Defining the kernel function $$f(x, y) = \exp\left(-\frac{x^2 + y^2}{\ell^2/2}\right)$$

the filtered heights $h_{ij}$ may be computed from $$h_{ij} = \frac{2}{\ell\sqrt{\pi}} \sqrt{\frac{L_x L_y}{N_x N_y}} f(x_i, y_j) * z_{ij}$$

where $a_{ij} * b_{ij} = F^{-1}(F(a_{ij})F(b_{ij}))$ denotes the 2D convolution with 2D discrete Fourier transforms $$A_{i'j'} = F(a_{ij}) = \sum_{i=0}^{N_x-1} \sum_{j=0}^{N_y-1} \omega_x^{-ii'} \omega_y^{-jj'} a_{ij}$$

-continued $$a_{ij} = F^{-1}(A_{i'j'}) = \frac{1}{N_x N_y} \sum_{i=0}^{N_x-1} \sum_{j=0}^{N_y-1} \omega_x^{+ii'} \omega_y^{+jj'} A_{i'j'}$$

$$\text{where } \omega_x = \exp\left(\frac{2\pi i}{N_x}\right) \text{ and } \omega_y = \exp\left(\frac{2\pi i}{N_y}\right)$$

are complex roots of unity and the i in these last two expressions is the imaginary number.

The result of this filtering process is a random height field $h_{ij}$ whose values are Gaussian distributed with mean zero and standard deviation σ and are correlated as $$h_{ij} * h_{ij} \propto \exp\left(-\frac{x_i^2 + y_j^2}{\ell^2}\right)$$

The coordinates ($x_i$, $y_j$, $h_{ij}$) may be used to generate a triangle mesh, which captures the full geometry of microscopic roughness. Distinct instantiations of the same rough surface may be obtained by performing this filtering operation process multiple times with different initial random values $z_{ij}$. A statistical ensemble of explicit rough surface models may be computed in this way. When this ensemble of rough surface models is combined with information about the electrical properties of the material (e.g., Fresnel coefficients or dielectric constants), an ensemble of RCS measurements may then be computed from direct simulation. In one embodiment, the direct simulation may be carried out using basic SBR limited to a single bounce (i.e. reflected/transmitted rays are not traced). However, in general any electromagnetic field solver may be used, including full-wave solvers based on finite-elements or integral equations.

Figure 3:
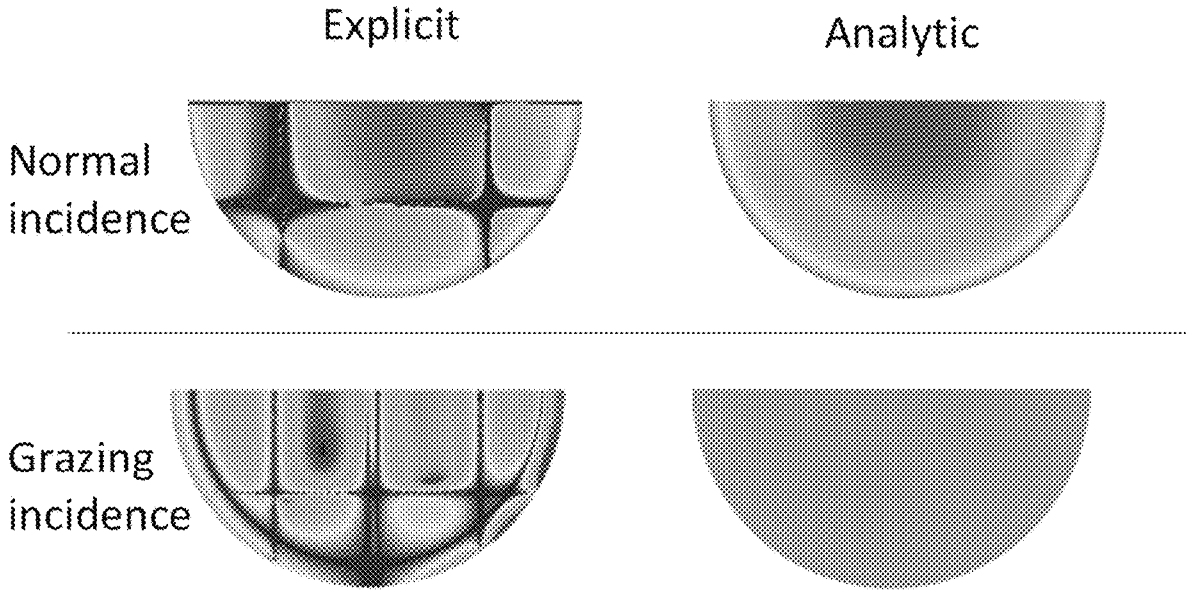
FIG. 3 illustrates the coherent field scattered from rough asphalt, and compares the scattered coherent field from the explicit calculation with that from an analytical model where the 3D surface microgeometry is generated analytically assuming a specific statistical distribution of height and spatial correlations.

FIG. 3 illustrates the coherent field scattered from rough asphalt and compares the analytical model of coherent attenuation with the explicit calculation. The rough asphalt is assumed to have Gaussian distributed heights and spatial correlations, with σ=0.3 mm and $\ell$=1.5 mm. The top of FIG. 3 shows the scattered coherent field for a ray at a normal incident angle based on the explicit calculation and the analytical model; the bottom of FIG. 3 shows the scattered coherent field for a ray at a grazing incident angle based on the explicit calculation and the analytical model. The semi-circles represent the top hemi-sphere of the far-field observation sphere projected onto the xy-plane. In this case the roughness is isotropic, so the scattered coherent field is symmetric about the plane of incidence and only half the hemi-sphere is shown.

Comparing the explicit calculation with the analytical model, the analytic model does well at predicting the coherent field attenuation near normal incidence but fails to predict enhanced coherent field at grazing incidence. In one aspect, the data-driven approach outlined above includes enhancement as well as attenuation of the coherent field to more accurately model the coherent scattering across all angles of incidence. Such enhancement can occur for example at grazing angles where the surface slopes are distributed along a preferred angle so as to elevate the returns along the backscatter direction. In one aspect, the data-driven approach may compute the scattered coherent field using a BSDF compiled from an ensemble mean of bistatic RCS measurements recorded from sections of the rough surface across the full range of incident/observation angles, polarizations and frequencies of interest.

Figure 4:
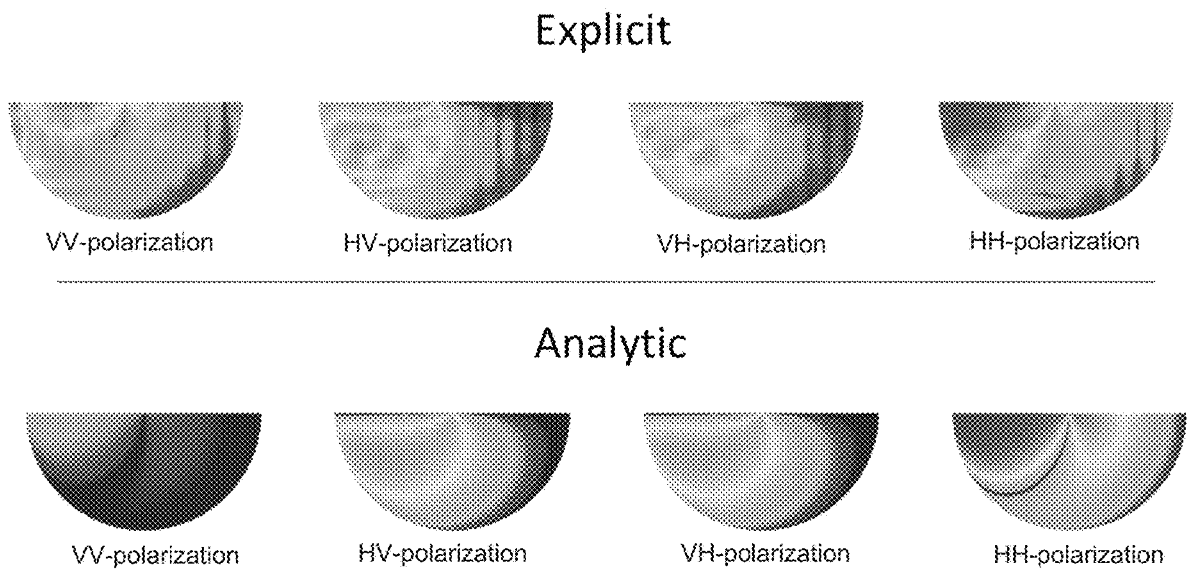
FIG. 4 illustrates the incoherent field scattered from rough asphalt, and compares the scattered incoherent field magnitude from the explicit calculation with that from an analytical model where the 3D surface microgeometry is generated analytically assuming a specific statistical distribution of height and spatial correlations.

FIG. 4 illustrates the incoherent field scattered from rough asphalt, and compares incoherent field magnitudes computed from the explicit calculation with the analytic Beckmann Kirchhoff model. The rough asphalt is assumed to have Gaussian distributed heights and spatial correlations with σ=0.3 mm and $\ell$=1.5 mm. The incoherent field is evaluated at 30-degree incident elevation, which is near Brewster's angle for this surface. The top of FIG. 4 shows the incoherent field for the four polarization states $\hat{v}\hat{v}$,$\hat{v}\hat{h}$,$\hat{h}\hat{v}$, $\hat{h}\hat{h}$ (where OI represents observed field in polarization O due to incident field in polarization I) based on explicit calculation. The bottom of FIG. 4 shows the incoherent field for the four polarizations based on the analytical model.

Comparing the explicit calculation with the analytical model, the analytic model does well at predicting the incoherent field scattering for the $\hat{v}\hat{h}$,$\hat{h}\hat{v}$, and $\hat{h}\hat{h}$ polarizations, but fails to predict the incoherent field scattering for the $\hat{v}\hat{v}$ polarization. This is due to the Brewster angle effect. For the flat surface, the incident $\hat{v}\hat{v}$ polarization is extinguished for rays incident at Brewster's angle. However, for the rough surface, the impact of Brewster's angle is reduced, since for rough surfaces there is not a single incident angle but rather a distribution of incident angles. Aspects of the disclosed data-driven approach improve the accuracy of the analytic model, by explicitly simulating interactions with the rough surface micro-geometry. Accuracy enhancements include, but are not limited to, elevated backscatter at grazing angles, reduced impact at Brewster's angle, and elevated cross-polarization levels. In one aspect, the data-driven approach may compute the magnitude of the scattered incoherent field using a BSDF compiled from an ensemble variance of bistatic RCS measurements recorded from sections of the rough surface across the full range of incident/observation angles, polarizations and frequencies of interest.

An ensemble of incoherent phase BSDFs may also be computed by taking each ensemble member subtracting the mean field and normalizing by the standard deviation. These BSDFs may be used during simulation to determine the phase of the incoherent field as a function of frequency, incident/observation angle and the geometry of the projected ray-tube footprint.

Regardless of how the incoherent field magnitudes are modeled (e.g., either analytically or using the data-driven approach presented in this disclosure), the incoherent field incorporated into the SBR coherent scattering methodology may be modulated by a complex phase. This phase is by definition a random field with mean zero. It must be random, otherwise the mean radiated power will depend on the number of rays illuminating the target. For the model to be self-consistent, the resulting field statistics should not depend on the simulation ray density. Choosing a random phase is not enough however: the fluctuations should also be properly correlated across frequency, footprint size, and incident/scattering angles. As will be shown in FIG. 9, ignoring these correlations produces incorrect field statistics.

The normalized incoherent fluctuations may be isolated by computing $\tilde{E}_n \equiv (E_n - \bar{E})/|E|$. That is, taking an instance from the measurement ensemble, subtracting the mean (coherent) component and normalizing by the standard deviation (incoherent) component. The result is a fluctuating phase field with mean zero and standard deviation one, which is properly correlated across frequency and incident/scattering angles. It may be considered an additional BSDF for incoherent phase, which may be evaluated during an SBR simulation to provide a sample phase for the incoherent field.

Figure 5:
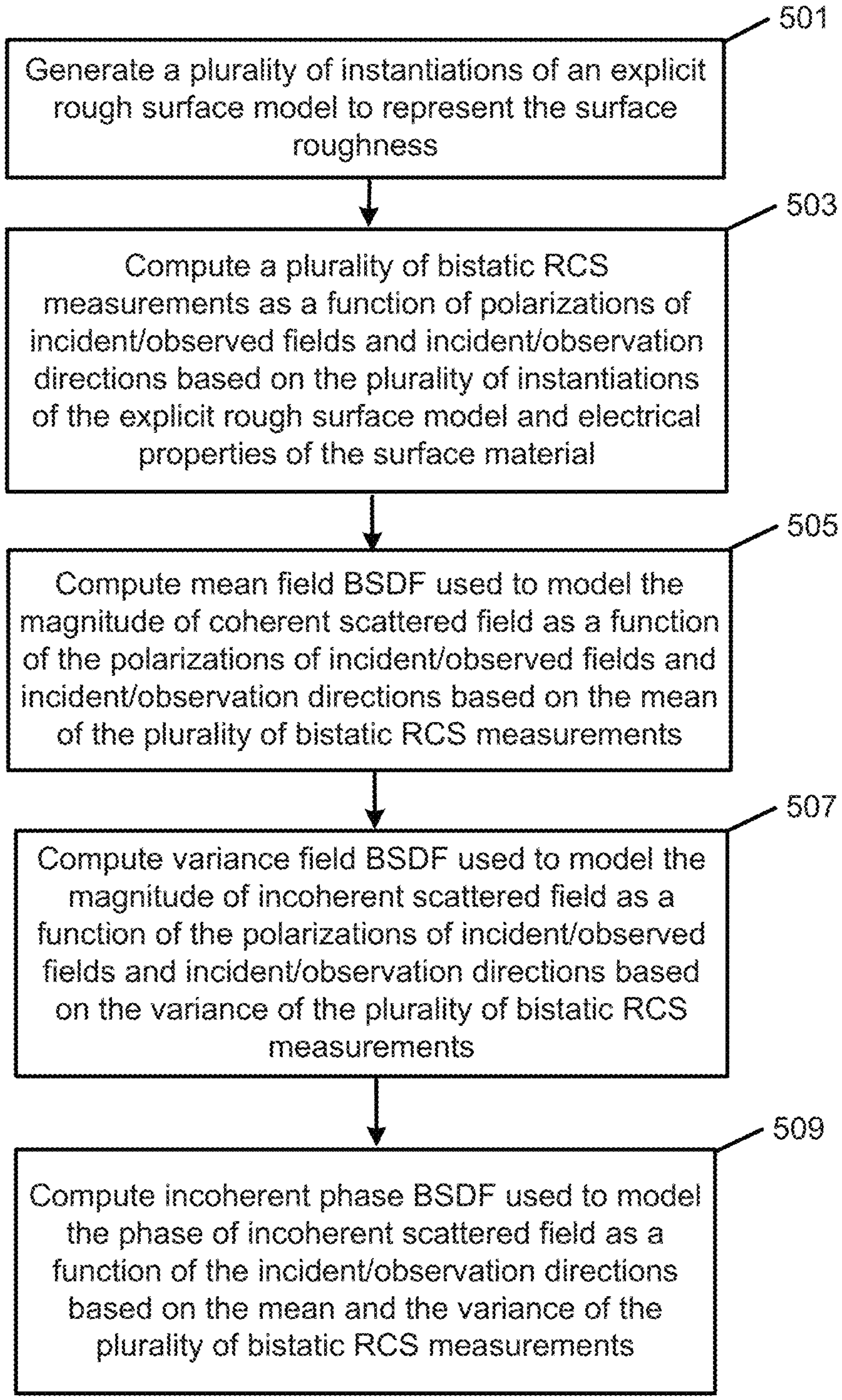
FIG. 5 illustrates a flow diagram of a method to compile an ensemble of bistatic radar cross-section (RCS) measurements recorded from rough surface into the BSDF for the coherent field magnitude, incoherent field magnitude and incoherent field phase used to compute the scattering contributions from the coherent field and incoherent field in accordance with one embodiment of the disclosure.

FIG. 5 illustrates a flow diagram of a method 500 to compile an ensemble of bistatic radar cross-section (RCS) measurements recorded from rough surface into the BSDF for the coherent field magnitude, incoherent field magnitude and incoherent field phase used to compute the scattering contributions from the coherent field and the incoherent field in accordance with one embodiment of the disclosure.

In operation 501, the method 500 generates an ensemble of instantiations of an explicit rough surface model to represent the surface roughness. Each member of the ensemble may represent a distinct representation of the geometric and electromagnetic description of the microscopic roughness of the surface. This rough surface micro-geometry may be described statistically. In one embodiment, a Gaussian distribution may be chosen for both the standard deviation $\sigma$ of surface heights and the correlation length parameter $\ell$.

In operation 503, the method 500 computes an ensemble of bistatic RCS measurements as a function of the four polarizations of incident/observed fields across a range of incident/observation directions for a simulation frequency of interest based on the ensemble of instantiations of the explicit rough surface model and electrical properties of the surface material (e.g., Fresnel coefficients or dielectric constants). In one embodiment, $E_n(k,\vec{k}^i,\vec{k}^o,\vec{p}^i,\vec{p}^o)$ may represent the field scattered by the $n^{th}$ member of the ensemble of explicit rough surface models, observed along direction $\hat{k}_o$ in polarization $\hat{p}_o$ due to a plane wave of unit magnitude incident along direction $\hat{k}_i$ in polarization $\hat{p}_i$ at simulation frequency $f=2\pi/k$.

In operation 505, the method 500 computes the mean field BSDF used to model the magnitude of the coherent scattered field as a function of the four polarizations of incident/observed fields and the incident/observation directions based on the mean of the ensemble of bistatic RCS measurements. In one embodiment, the mean field may be a scalar factor representing a ratio of the mean field across the ensemble over the scattered field for the flat surface. This scalar factor may be an attenuation or an enhancement factor that depends on the field parameters $k,\vec{k}^i,\vec{k}^o,\vec{p}^i,\vec{p}^o$.

In operation 507, the method 500 computes the variance field BSDF used to model the magnitude of the incoherent scattered field as a function of the four polarizations of incident/observed fields and the incident/observation directions based on the variance of the ensemble of bistatic RCS measurements. The variance field BSDF may be used to model the magnitude of the incoherent scattered field by decomposing the incident field into its incident polarization components, interpolating the standard deviation derived from the variance field BSDF based on incident/observation directions, and summing the results over the observed polarization components.

In operation 509, the method 500 computes the incoherent phase BSDF used to model the random phase of the incoherent scattered field across the range of incident/observation directions based on the mean and the variance of the ensemble of bistatic RCS measurements. In one embodiment, the incoherent phase BSDF may represent normalized fluctuations of the incoherent scattered field. It may be computed by taking a member from the ensemble of bistatic RCS measurements, subtracting the mean (coherent) component derived from the mean field BSDF, and normalizing by the standard deviation (incoherent) component derived from the variance field BSDF. The result we are calling the "incoherent phase" BSDF, and may be represented by $\tilde{E}_n$. It describes the correlation structure of incoherent field fluctuations across frequency as well as incident and scattering angle, which is scale invariant with the size of the planar rectangular of rough surface used to generate the RCS ensemble.

In one embodiment, the correlated fluctuations in the incoherent field $\tilde{E}_n$ may be synthesized directly, instead of relying on computing statistics. For instance, prior to simulation it is possible to generate a single large table $\tilde{E}$ of pre-determined size, which may be larger than the rough surface samples used to build the BSDF for the incoherent magnitude. An incoherent phase BSDF at frequency f and wavelength $\lambda=c/f$ (where c is the speed of light) may be synthesized for a rough plate of dimensions $(L_x,L_y)$ consisting of $(N_x,N_y)$ points. The incoherent phase BSDF may be synthesized by a filtering operation similar to the filtering operation used for generating explicit rough surfaces. Let $z_{ij}$ be a grid of $N_x \times N_y$ randomly distributed complex numbers, whose real and imaginary values are drawn from independent normal distributions $$N\left(0, \frac{1}{2}\right)$$

with zero mean and variance ½. The correlated fluctuations in the incoherent field $\tilde{E}$ may be obtained from the convolution $$\tilde{E}_{ij} = \frac{\lambda N_x N_y}{2\sqrt{L_x L_y}} F_{ij}(L_x, L_y, \lambda) * z_{ij},$$

with a sinc kernel:

$$F_{ij}(L_x, L_y, \lambda) = \begin{cases} 1 \text{ if } i \in [-L_x, L_x]/\lambda \text{ and } j \in [-L_y, L_y]/\lambda \\ \text{else } 0 \end{cases}$$

The fluctuations $\tilde{E}_n$ are observed to be remarkably independent of the choice of roughness parameters $\sigma$ and $\ell$. This is beneficial, since it allows one set of $\tilde{E}$ to be used for all rough surfaces. They are nonetheless limited however in that the correlations are tied to the dimensions of the rough surface samples used to generate the ensemble of RCS measurements or the synthesized fluctuations, which will not in general coincide with the size of the projected ray-tube footprints during simulation. A sampling technique may be used to adapt the result to footprints of arbitrary footprints size based on the observation that the structure of the phase correlations is scale-invariant to the footprint size.

Figure 6:
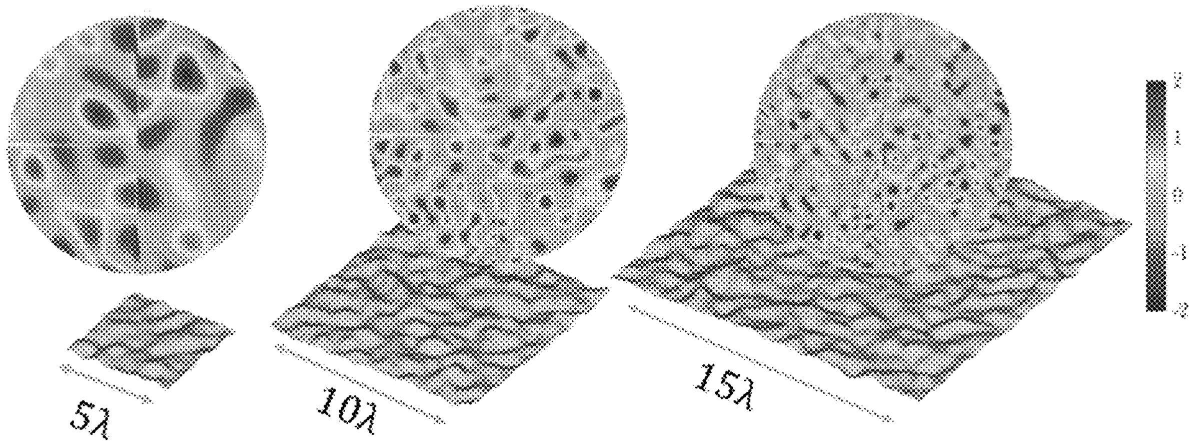
FIG. 6 illustrates the fluctuations of the incoherent field (the incoherent phase BSDF) BSDF computed for rough asphalt where the 3D surface microgeometry is generated analytically assuming a specific statistical distribution of height and spatial correlations.

FIG. 6 illustrates the fluctuations of the incoherent field scattered from the microscopic surface of rough asphalt modeled using a complex phase drawn from the incoherent phase BSDF for the random phase in accordance with one embodiment of the disclosure. The 3D surface micro-geometry of the rough asphalt is generated analytically assuming a specific distribution of height and spatial correlations. The rough asphalt is assumed to have $\sigma$=0.3 mm and $\ell$=1.5 mm. Three distinct sizes of sample plates for the explicit rough surface, 5λ, 10λ, and 15λ are shown where λ=3.9 mm at 77 GHz.

The fluctuations are visualized by projecting the far-field sphere down to a unit circle on the xy-plane. In these coordinates, the $\hat{z}$ direction coincides with the surface normal $\hat{n}$ disambiguated to point towards the launch point of the incident ray. Each point in this circle is associated with a unique observation direction $\hat{k}_o$ in either the upper or lower far-field hemisphere. Note how the fluctuations are scale-invariant with the size of the plate. That is, the phase distribution for a smaller plate may be obtained by subsampling the distribution for a larger plate.

The sampling technique interpolates $\tilde{E}$ in a way that produces an equivalent set of random fluctuations $\tilde{E}'$ whose correlations across frequency and incident/observation angle matches roughly the size of each ray-tube footprint processed in an SBR simulation. In this embodiment, the ensemble is assumed to be generated from a set of explicit rough surfaces, which are planar rectangles with dimensions $\vec{L}=(L_x,L_y)$. The procedure may be summarized as follows:

1. For each rough surface either assign at random an instance n of the phase BSDF $\tilde{E}_n$ from the ensemble, or use a set of synthesized fluctuations $\tilde{E}$. If needed, extend $\tilde{E}$ by implementing periodic boundary conditions and/or combining with other instances n from the same ensemble. The rough surface used to generate the ensemble of RCE measurements for the phase BSDF $\tilde{E}_n$ or to synthesize the fluctuations $\tilde{E}$ may be a rectangle.
2. For each ray hit point on a rough surface choose an unique random point $\vec{c}=(c_x,c_y)$, which will be the center of the new far-field sphere that is specific to each ray. This step is required so that each ray is assigned a unique random phase. It also reflects the observation that the fluctuations are spatially homogeneous when viewed from their projected far-field circle.
3. For each ray-tube footprint with dimensions $\vec{L}'$, select an ellipse centered at $$\vec{c}-k'(k_x^i,k_y^i)$$

with axes $$\vec{r}=\frac{k}{k'}\left(\frac{L_x'}{L_x},\frac{L_y'}{L_y}\right)$$

to define the new far-field hemisphere specific to each ray, where (L'x, L'y) is the dimension of the ray-tube footprint, and $$(k_x^i,k_y^i)$$

is the incidence direction of the ray decomposed into the two axes. The translation of the phase circle by $$\vec{c}-k'(k_x^i,k_y^i)$$

maintains the correlations of the random fluctuations of the incoherent field across the incidence direction. The phase circle of the planar rectangle of the rough surface used to generate the ensemble of RCS measurements is thus rescaled by $$\vec{r}=\frac{k}{k'}\left(\frac{L_x'}{L_x},\frac{L_y'}{L_y}\right)$$

to match the relative size of the ray-tube footprint.

Figure 7:
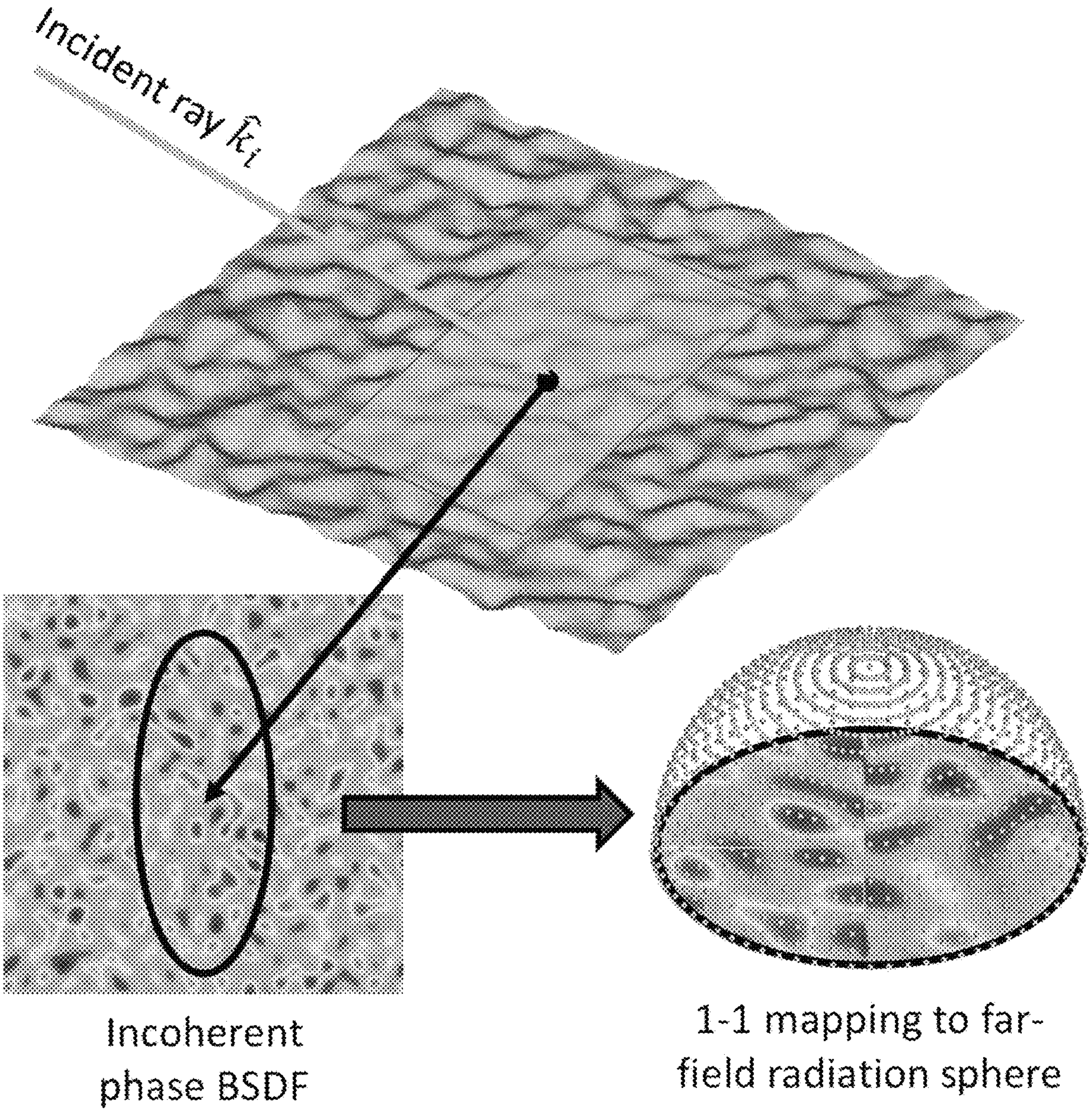
FIG. 7 illustrates a technique to interpolate the incoherent phase BSDF modeled using a square surface to an arbitrary rectangular ray-tube footprint to produce an equivalent set of random fluctuations whose correlation structure matches the size of the ray-tube footprint in accordance with one embodiment of the disclosure.

4. For each observation direction $\hat{k}^o$, sample the incoherent phase by interpolating the incoherent phase BSDF using the one-to-one mapping between the ellipse and the far-field hemisphere. Specifically, consider $\hat{k}^o$ in spherical coordinates $$\hat{k}^o=\{\sin\theta^o\cos\phi^o,\ \sin\theta^o\sin\phi^o,\ \cos\theta^o\}$$

where $f^o$, $\phi^o$ are the scattered theta and phi angles respectively and the $\hat{z}$ direction is aligned along the surface normal of the projected ray-tube footprint and is disambiguated to point towards the oncoming ray. The $\hat{x}$ and $\hat{y}$ components of $\hat{k}^o$ lie on a unit disk and may be used to define a one-to-one mapping to the phase circle defined in step 3 on the incoherent phase BSDF. Therefore, for each observation direction $\hat{k}^o$, the complex phase used to modulate the incoherent field magnitude is determined by interpolating the value within the phase circle defined on the incoherent phase BSDF that corresponds to the 2D projection of the vector $\hat{k}^o$ onto the xy-plane, i.e. $\{\hat{k}^o\cdot\hat{x},\ \hat{k}^o\cdot\hat{y}\}$ FIG. 7 illustrates the technique to interpolate the incoherent phase BSDF, or the synthesized fluctuations $\tilde{E}$, modeled using a square surface to an arbitrary rectangular ray-tube footprint to produce an equivalent set of random fluctuations whose correlation structure matches the size of the ray-tube footprint in accordance with one embodiment of the disclosure.

Sampling the incoherent phase in this way, the resulting incoherent field exhibits the proper correlations across frequency as well as incident and observation angle. The incoherent phase BSDF or the synthesized fluctuations $\tilde{E}$ may also be interpolated over frequencies for a ray-tube footprint by scaling the radius of the far-field sphere (e.g., zoom in/out), and interpolated over incident angles for a ray-tube footprint through translation to maintain the correlations of the incoherent response across frequencies and incident/scattering angles. Results demonstrate that sampling the incoherent phase in this way produces an incoherent field whose mean and variance are independent of the simulation ray density of the ray-tube footprints and closely match results obtained from direct simulation of a microscopic description of the rough surface.

Figure 8:
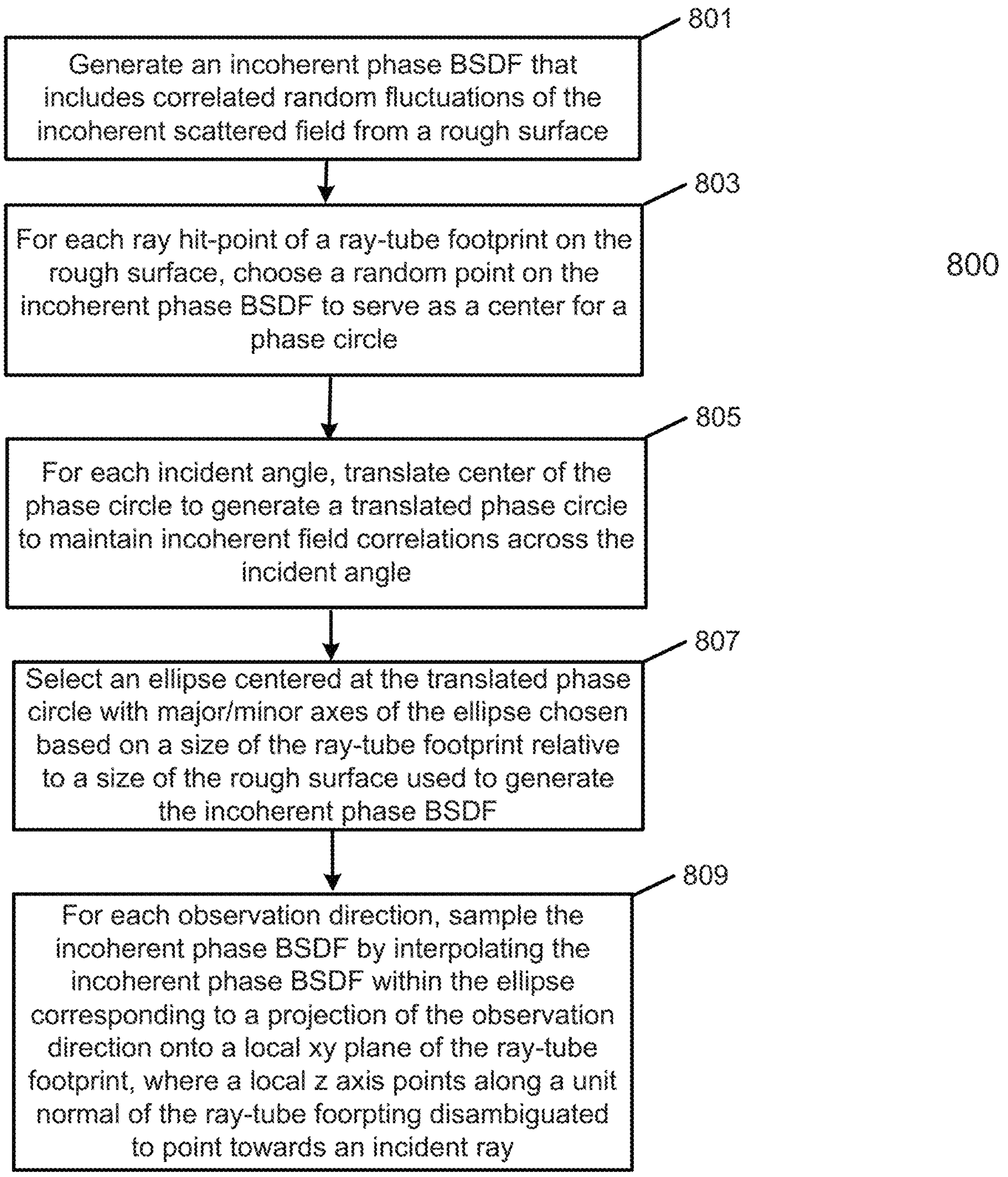
FIG. 8 illustrates a flow diagram of a method to sample the fluctuations of the incoherent phase to produce an equivalent set of random fluctuations whose correlation structure matches roughly the size of the ray-tube footprint.

FIG. 8 illustrates a flow diagram of a method 800 to sample the fluctuations of the incoherent phase to produce an equivalent set of random fluctuations whose correlation structure matches roughly the size of the ray-tube footprint.

In operation 801, an ensemble of fluctuations of the incoherent phase is generated from a set of explicit rough surfaces. In one embodiment, the fluctuations of the incoherent phase may be synthesized directly as previously described. An instance of the phase BSDF is selected from the ensemble or the synthesized fluctuations is used for the incoherent phase sampling.

In operation 803, for each ray hit-point of a ray-tube footprint on the rough surface, the method 800 chooses a center for the phase circle $\vec{c}$, which will be the center of the far-field hemisphere for each ray. The far-field hemisphere may represent the normalized fluctuations of the incoherent field scattered from a square area of the rough surface observed at different observation angles. However, the ray-tube footprint may be a rectangle. The phase circle may represent the projection of the normalized fluctuations of the far-field hemisphere down to a unit circle on the xy-plane of the rough surface.

In operation 805, for each incident angle the method translates the phase circle $$\vec{c} - k'(k_x^i, k_y^i)$$

to generate a translated phase circle to maintain correlations of the incoherent field across the incident angle. The translation may interpolate the incoherent field across the incident/scattering angles.

In operation 807, the method 800 rescales the major/minor axes of the translated phase circle by $$\vec{r} = \frac{k}{k'}\left(\frac{L_x'}{L_x}, \frac{L_y'}{L_y}\right)$$

to match the electrical size of the ray-tube footprint, relative to the size of the planar rectangle of rough surface used to generate the incoherent phase BSDF or the synthesized fluctuations. The rescaling adapts the size of the incoherent phase BSDF or the synthesized fluctuations to the geometry of each specific projected ray-tube footprint by creating an ellipse centered at the translated phase circle to define the far-field hemisphere for the ray-tube footprint.

In operation 809, for each observation direction $\hat{k}^o$ the method 800 samples the incoherent phase BSDF by interpolating the value within the ellipse defined in 807 corresponding to the projection of $\hat{k}^o$ onto the local xy plane of the projected ray-tube footprint, where the local $\hat{z}$ axis points along the unit normal of the ray-tube footprint disambiguated to point towards the oncoming ray. This value is used as a complex incoherent phase to modulate the corresponding incoherent field magnitude.

Figure 9:
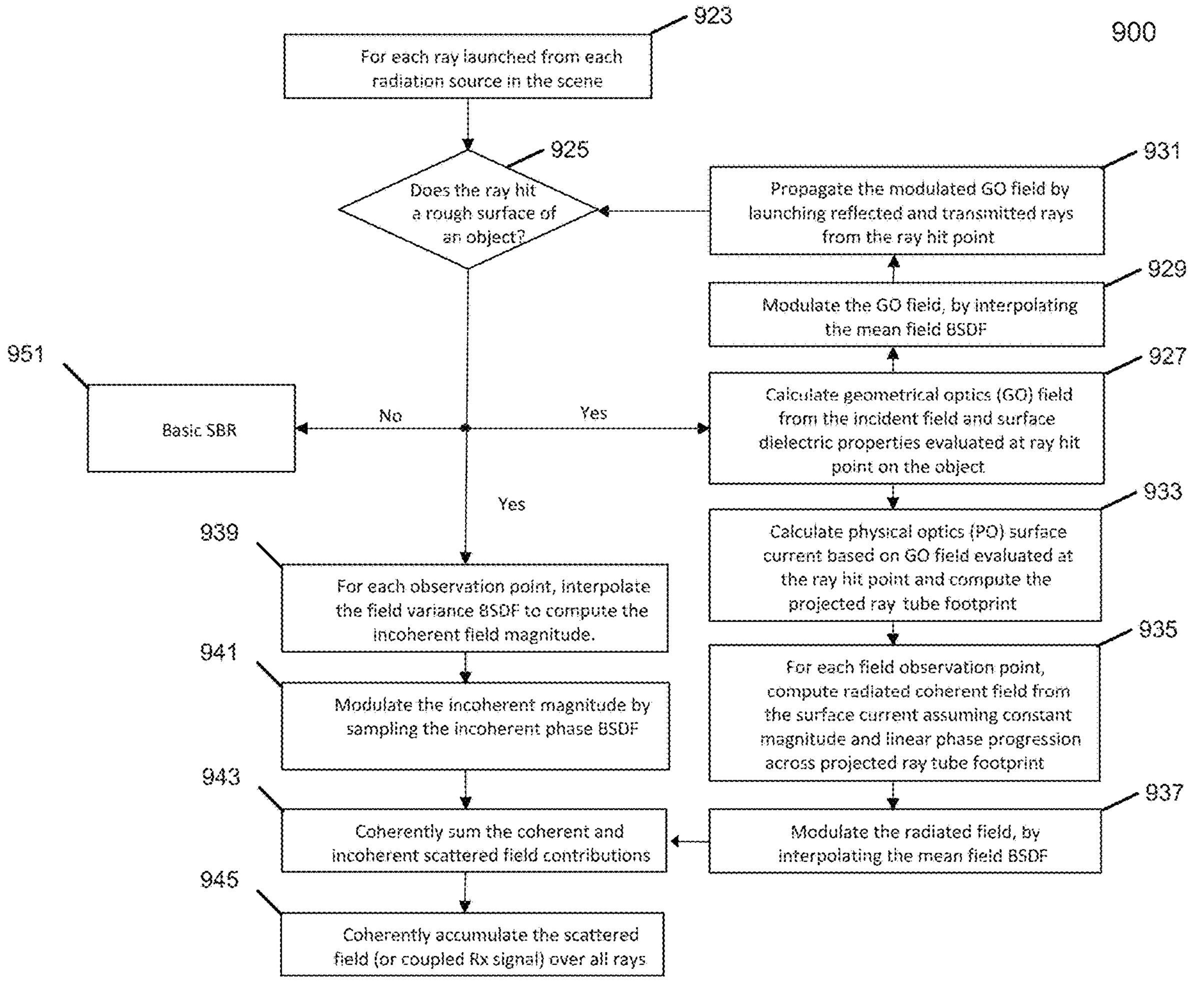
FIG. 9 illustrates a flow diagram of a method to use the SBR technique that aggregates coherent and incoherent scattering contributions from microscopic surface roughness by using BSDF compiled from field statistics for the coherent field magnitude, incoherent field magnitude and incoherent field phase in accordance with one embodiment of the disclosure.

FIG. 9 illustrates a flow diagram of a method 900 to use the SBR technique that aggregates coherent and incoherent scattering contributions from microscopic surface roughness by using BSDF compiled from field statistics for the coherent field magnitude, incoherent field magnitude and incoherent field phase in accordance with one embodiment of the disclosure. A pre-processing operation (not shown) may compute an ensemble of bistatic RCS measurements as a function of the four polarizations: $\hat{v}\hat{v},\hat{v}\hat{h},\hat{h}\hat{v},\hat{h}\hat{h}$ of the incident/observed fields and a range of incident/observation directions due to a plane wave of unit magnitude for a simulation frequency of interest. In one embodiment, the ensemble of bistatic RCS measurements may be computed for a range of simulation frequencies. The mean and variance of the members of the ensemble may be computed as a function of the polarizations of the incident/observed fields and the incident/observation directions. The results will be used as BSDFs to determine the coherent field and incoherent field magnitude respectively from the incident coherent field. Incoherent phase BSDFs may also be computed from an ensemble member by subtracting the mean field and normalizing by the standard deviation. The incoherent phase BSDFs may be used to determine the incoherent field phase from the incident coherent field.

In operation 923, a new volumetric ray-tube is launched from a radiation source, such as a transmitting antenna or plane wave. In operation 925, it is determined whether the ray launched in operation 923 hits a rough surface of the object model. If the ray does not hit a rough surface, operation 951 uses the basic SBR methodology to evaluate any reflected and transmitted fields for the ray hitting a non-rough surface or to launch additional volumetric ray-tubes if the ray does not hit any surface.

If the ray hits a rough surface, operation 927 projects the volumetric ray-tube onto the object surface by computing its projected ray-tube footprint. Operation 927 calculates the reflected and transmitted (for penetrable materials) coherent GO fields at the ray hit point associated with the projected ray-tube footprint from the incident field based on the dielectric properties of the rough surface.

Operation 929 modulates (i.e., multiplies) the coherent GO fields by a multiplicative scale factor computed from the mean field BSDF. In one embodiment, the multiplicative scale factor may be determined by sampling or interpolating the mean field BSDFs. These typically attenuated coherent GO fields are used to trace additional rays in the specular reflection and transmission directions. Operation 931 propagates the modulated coherent GO fields by launching reflected and transmitted rays from the ray hit point.

In operation 933, the method 900 calculates equivalent electric and magnetic currents of the projected ray-tube footprint from the original GO fields (i.e., the GO fields before the multiplicative scale factor is applied) according to the PO approximation and the EM properties of the object's surface materials. For each field observation point, operation 935 calculates a coherent component of the scattered field radiated by the equivalent PO currents. In one embodiment the radiation integral assumes constant current magnitude and linear phase progression over the projected ray-tube footprint. Operation 937 modulates the coherent scattered field radiated by the equivalent PO by a scale factor. As with the coherent GO field, the scale factor may be determined by sampling or interpolating the mean field BSDF. In one embodiment, the mean field BSDF sampled may correspond to the incident direction and the observation direction of the scattered field from the projected ray-tube footprint.

For the incoherent component of the scattered field, in operation 939, for each field observation point, the method 900 samples or interpolates the variance field BSDF to determine the incoherent field magnitude. In one embodiment, the variance field BSDF sampled may correspond to the incident direction and the observation direction of the scattered field from the projected ray-tube footprint. Operation 941 modulates (i.e., multiplies) the incoherent field magnitude with a complex phase drawn from the incoherent phase BSDF, which accounts for correlations across frequency, incident/observation angle and the size of the footprint.

Operation 943 coherently sums the coherent scattered field and the incoherent scattered field for each ray. Operation 945 coherently accumulates the scattered field (or coupled RF signal at a receiving antenna) across all rays over a plurality of projected ray-tube footprints. The result is an estimate of the scattered field generated by the collection of instantiations of all rough surfaces in the scene. The resulting power distributions of the scattered field are approximately invariant with respect to the number of rays (e.g., ray-density) and are consistent with results obtained from direct numerical simulation of explicit rough surfaces. The accumulated scattered field may be post-processed to represent an imagery of the object. For example, the imagery may be a synthetic-aperture-radar (SAR) images formed by post-processing the accumulated scattered field when the SBR technique is used for radar simulation.

Figure 10:
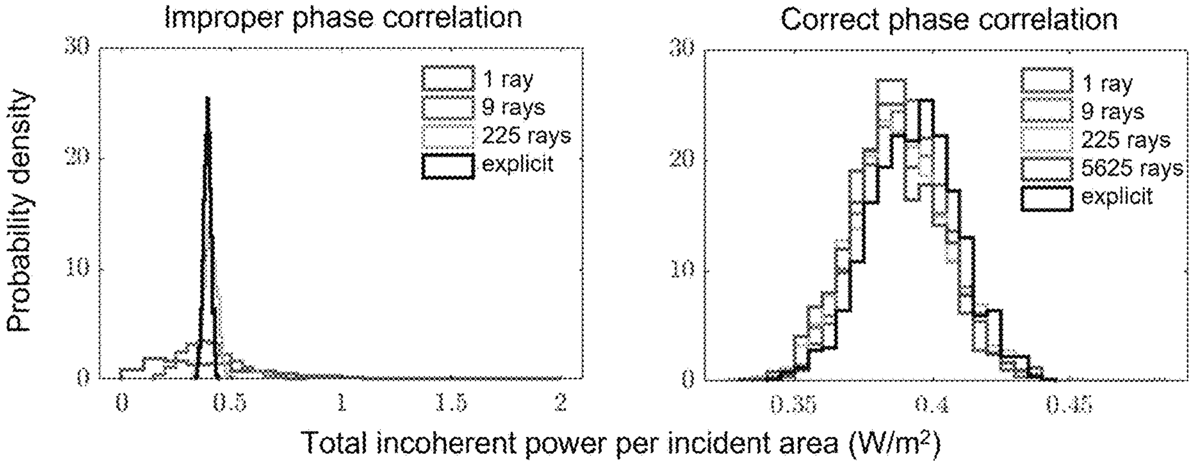
FIG. 10 illustrates the probability distribution of incoherent power as a function of the number of rays in accordance with one embodiment of the disclosure.

FIG. 10 illustrates the probability distribution of total incoherent power as a function of the number of rays in accordance with one embodiment of the disclosure. Total incoherent power is computed by computing incoherent field over the entire far-field sphere and integrating the field power over the spherical domain. The calculation is repeated to collect samples across an ensemble of rough surface instances, and the probability distribution is then computed from these samples.

In the left panel, an incoherent phase is chosen per ray from a random uniform distribution [0,2π]. The incoherent fields are assumed to be perfectly correlated across far-field angle and frequency according to the relation: $e^{jk(\vec{k}^i-\vec{k}^o)}$. With this approximation on the phase of the incoherent field, it is clear the incoherent power distribution depends on the number of rays. This result is not physical, because the ray density is a simulation parameter that should not affect the physics of the scattered field. If, on the other hand, the incoherent phase is properly correlated using the incoherent phase BSDF or the synthesized fluctuations $\tilde{E}$ in accordance with one embodiment of the disclosure, the right panel shows that the incoherent power is independent of the number or rays and closely matches the result for an explicit rough plate.

This sampling technique assumes that all ray-tube footprints are large compared with the scale of microscopic roughness, as the model seeks to reproduce aggregate response of the rough surface over the footprint. This is the typical situation. If, on the other hand, the footprints are on the same length scale of the surface roughness a different approach is used. In one embodiment, sections of explicit rough surface may be mapped onto the model geometry. This mapping may be performed during simulation time and be used only when the ray-tube footprints are exceedingly small, similar to the way texture mapping is performed for rendering computer graphics.

The sampling technique as described models the ray-tube footprints as rectangles, which may not be the case in SBR. The technique may be adapted to ray-tube footprints of arbitrary shape by first subdividing the footprints into rectangular regions, and then performing the sampling procedure looping over these sub-footprints. There is a speed-accuracy tradeoff, in that using more sub-footprints increases the accuracy but may also increase computation time. Example results are shown in FIG. 10.

Figure 11:
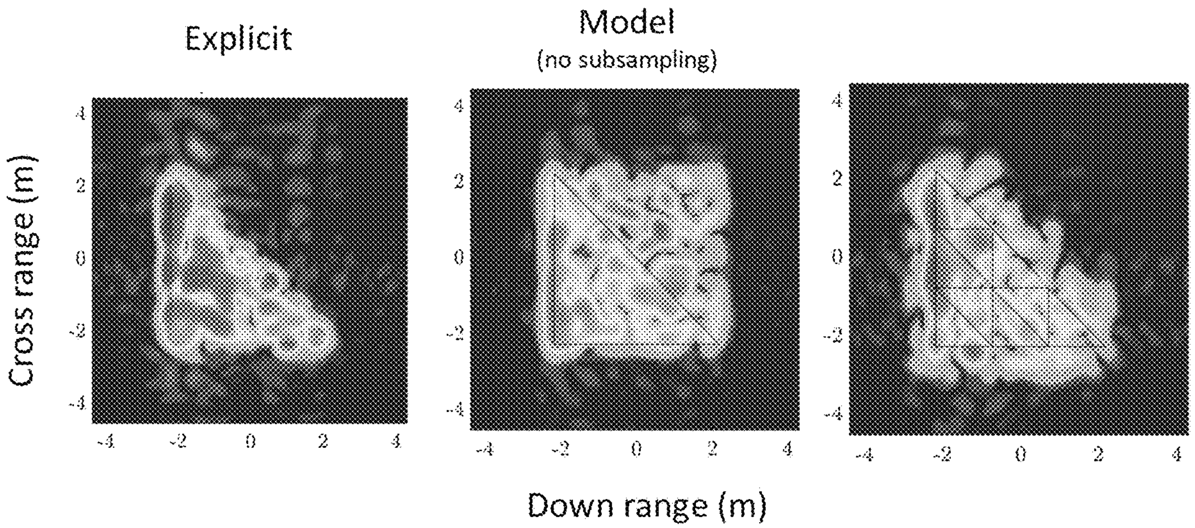
FIG. 11 illustrates the synthetic-aperture-radar (SAR) images formed using the SBR augmented by the data-driven framework that uses the field statistics of the BSDF in accordance with one embodiment of the disclosure.

FIG. 11 illustrates the synthetic-aperture-radar (SAR) images formed using the SBR augmented by the data-driven framework that uses the field statistics of the BSDF in accordance with one embodiment of the disclosure.

The SAR images are formed from performing SBR on a triangular region of rough surface. Results from SBR with explicitly modeled microscopic roughness on the left are compared with the result of the incoherent phase sampling procedure: with and without subsampling over subdivided sub-footprints. Since the sampling procedure assumes rectangular ray-tube footprints, the model without subsampling produces a rectangular SAR image in the middle. Subsampling the model over the subdivided sub-footprints produces a triangular SAR image on the right that approximates the SAR image from the explicitly modeled surface.

In one embodiment, when SBR is used for radar simulation it may be typical to simulate across a narrow frequency band a large number of radar pulses that are closely spaced in time. The incoherent phase sampling method may be adapted to perform this task efficiently as follows:

1. Initialize a rectangular 2D array of fields corresponding to the range and velocity period and resolution specification of the radar device to be simulated.
2. Simulate using rough-surface SBR at a single frequency in the desired frequency band. For rays that incident on rough surfaces, perform the incoherent sampling algorithm but accumulate receiver signal contributions from each sub-footprint into their respective range and velocity bins, based on cumulative ray pathlength and Doppler velocity from transmitter to receiver.
3. Post-process the binned field data using inverse Fast-Fourier Transforms to map the results from range-velocity space to frequency-time space to obtain the raw coupled signal as seen by the radar.

Figure 12:
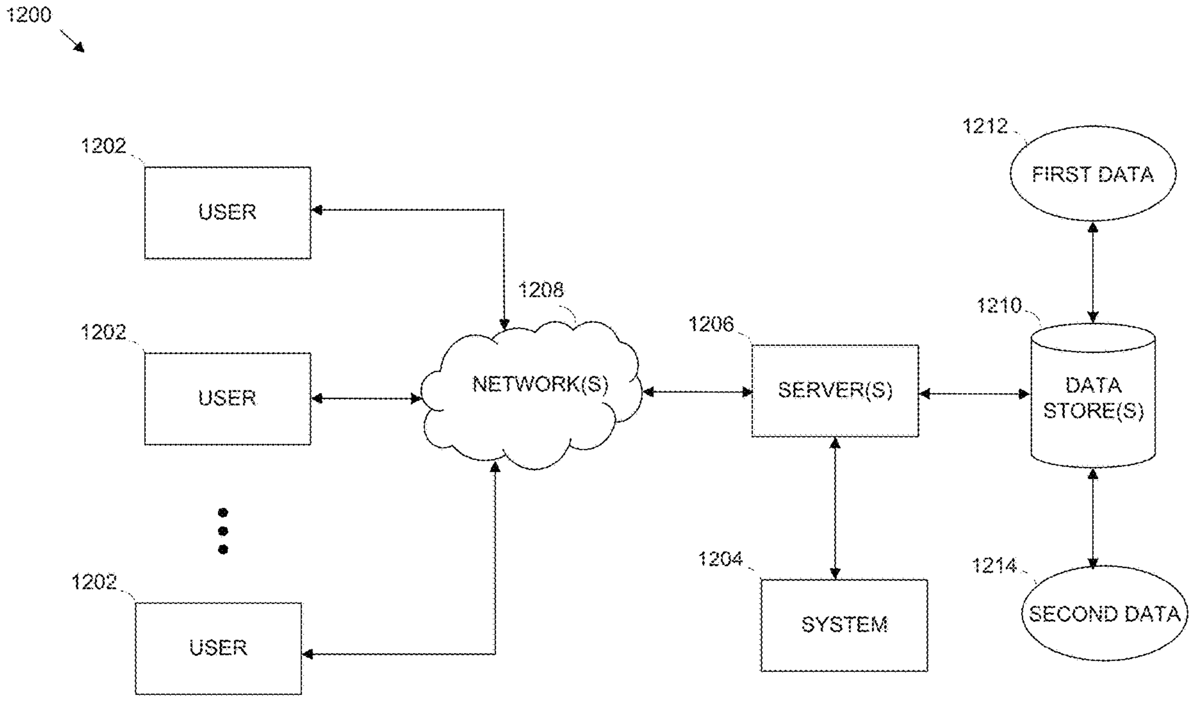
FIGS. 12 and 13 illustrate example systems which may be used in conjunction with the embodiments described herein.
Figure 13:
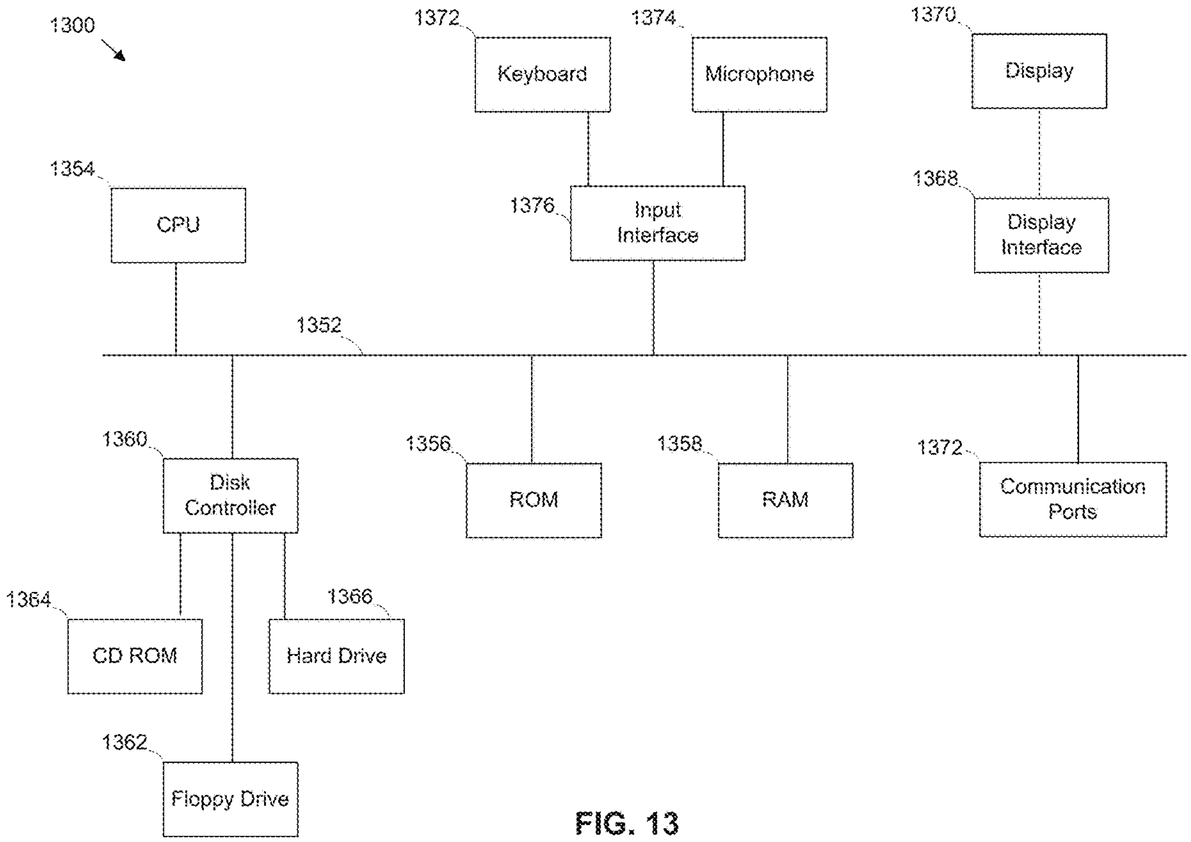

The methods and systems described herein may be implemented using any suitable processing system with any suitable combination of hardware, software and/or firmware, such as described below with reference to the non-limiting examples of FIGS. 12 and 13. FIGS. 12 and 13 illustrate example systems which may be used in conjunction with the embodiments described herein.

FIG. 12 depicts at 1200 a computer-implemented environment wherein users 1202 can interact with a system 1204 hosted on one or more servers 1206 through a network 1208. The system 1204 contains software operations or routines. The users 1202 can interact with the system 1204 through a number of ways, such as over one or more networks 1208. One or more servers 1206 accessible through the network(s) 1208 can host system 1204. Servers 1206 may have one or more data stores 1210 for storing data such as first data 1212 and second data 1214 accessible by the system 1204 when executing the software operations or routines. It should be understood that the system 1204 could also be provided on a stand-alone computer for access by a user.

FIG. 13 shows a block diagram of exemplary hardware for a standalone computer architecture 1300 that may be used to contain and/or implement the program instructions of system embodiments of the present disclosure. A bus 1352 may serve as the information highway interconnecting the other illustrated components of the hardware. A processing system 1354 labeled CPU (central processing unit) (e.g., one or more computer processors), may perform calculations and logic operations required to execute a program. A non-transitory computer-readable storage medium, such as read only memory (ROM) 1356 and random access memory (RAM) 1358, may be in communication with the processing system 1354 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 1360 interfaces one or more optional disk drives to the system bus 1352. These disk drives may be external or internal floppy disk drives such as 1362, external or internal CD-ROM, CD-R, CD-RW or DVD drives such as 1364, or external or internal hard drives 1366. As indicated previously, these various disk drives and disk controllers are optional devices. Software application may be stored in one or more of the disk drives connected to the disk controller 1360, the ROM 1356 and/or the RAM 1358. Preferably, the processor 1354 may access each component as required.

A display interface 1368 may permit information from the bus 1356 to be displayed on a display 1370 in audio, graphic, or alphanumeric format. Communication with external devices may optionally occur using various communication ports 1372.

In addition to the standard computer-type components, the hardware may also include data input devices, such as a keyboard 1372, or other input device 1374, such as a microphone, remote control, pointer, mouse, touchscreen and/or joystick. An input interface 1376 may interface the data input devices to the system bus 1352.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A method for computer aided electromagnetic (EM) field simulation, comprising:

obtaining statistics of a plurality of recorded scattered fields due to incident electromagnetic (EM) fields on a rough surface of an object;

simulating a projection of an excitation EM field from a radiation source onto the rough surface of the object for a plurality of scattered fields, wherein a plurality of sections of the rough surface of the object comprises a plurality of projected ray-tube footprints formed by a corresponding volumetric ray-tube projected onto the rough surface of the object, and wherein the corresponding volumetric ray-tube transports the excitation EM field from the radiation source to the rough surface of the object;

calculating a coherent component and an incoherent component for each of the plurality of scattered fields from the rough surface based on the statistics of the plurality of recorded scattered fields, the coherent component and the incoherent component for each of the plurality of scattered fields being scattered from the plurality of sections of the rough surface due to the excitation EM field incident on the rough surface at an incident direction;

generating an aggregate scattered field based on coherent components and incoherent components of the plurality of scattered fields, the aggregate scattered field representing a field scattered from the object due to the excitation EM field observed at an observation direction; and generating synthetic-aperture-radar (SAR) imagery of the object at an antenna by processing the aggregate scattered field for each of the projected ray-tube footprints using shooting and bouncing rays (SBR) technique based on coherently accumulating the aggregate scattered field over the projected ray-tube footprints.

2. The method of claim 1, wherein calculating the coherent component for each of the plurality of scattered fields comprises:

computing a geometrical optics (GO) approximation based on the excitation EM field incident on a section of the rough surface;

computing a physical optics (PO) approximation of equivalent surface currents induced on the section based on the GO approximation;

computing a radiated coherent field based on the PO approximation of equivalent surface currents with a constant magnitude and a linear phase progression across the section; and modulating the radiated coherent field based on a mean of the plurality of recorded scattered fields associated with the incident direction of the excitation EM field for the section and the observation direction of each of the plurality of scattered fields to obtain the coherent component of each of the plurality of scattered fields.

3. The method of claim 1, wherein calculating the incoherent component for each of the plurality of scattered fields comprises:

computing a magnitude of the incoherent component for each of the plurality of scattered fields for a section of the rough surface based on a variance of the plurality of recorded scattered fields associated with the incident direction of the excitation EM field for the section and the observation direction for each of the plurality of scattered fields; and modulating the magnitude of the incoherent component with a phase based on normalized fluctuations of the incoherent component for each of the plurality of scattered fields computed from the plurality of recorded scattered fields associated with the incident direction of the excitation EM field for the section and the observation direction to obtain the incoherent component for each of the plurality of scattered fields.

4. The method of claim 1, wherein the statistics are computed from the plurality of recorded scattered fields due to the incident EM fields on the rough surface by operations comprising:

generating a plurality of instantiations of an explicit model to represent height fluctuations of the rough surface;

computing a plurality of bistatic field measurements as a function of a plurality of incident field polarizations and observed field polarizations across a plurality of incident field directions and observed field directions based on the plurality of instantiations of the explicit model;

computing a mean of the plurality of bistatic field measurements to model a magnitude of a coherent scattered field due to the incident EM fields, wherein the mean is computed for each of a plurality of combinations of the incident field polarizations, the observed field polarizations, the incident field directions, and the observed field directions;

computing a variance of the plurality of bistatic field measurements to model a magnitude of an incoherent scattered field due to the incident EM fields, wherein the variance is computed for each of the plurality of combinations of the incident field polarizations, the observed field polarizations, the incident field directions, and the observed field directions; and computing normalized fluctuations of the incoherent scattered field based on the bistatic field measurements to model a phase of the incoherent scattered field due to the incident EM fields, wherein the normalized fluctuations are computed for each of a plurality of combinations of the incident field directions and the observed field directions.

5. The method of claim 4, wherein computing the normalized fluctuations of the incoherent scattered field for a given combination of an incident field direction and an observed field direction comprises:

subtracting the mean of the plurality of bistatic field measurements for the given combination of the incident field direction and the observed field direction from one of the bistatic field measurements to obtain zero-mean fluctuations of the incoherent scattered field; and normalizing the zero-mean fluctuations of the incoherent scattered field by the variance of the plurality of bistatic field measurements for the given combination of the incident field direction and the observed field direction to obtain the normalized fluctuations of the incoherent scattered field for the given combination of the incident field direction and the observed field direction.

6. The method of claim 1, wherein calculating the incoherent component for each of the plurality of scattered fields comprises:

generating a plurality of randomly distributed complex numbers to represent a plurality of samples of the rough surface;

filtering the plurality of randomly distributed complex numbers by a filtering function to generate normalized fluctuations of the incoherent component for each of the plurality of scattered fields; and modulating a magnitude of the incoherent component for a section of the rough surface and the observation direction for each of the plurality of scattered fields with a phase based on the normalized fluctuations of the incoherent component for each of the plurality of scattered fields to obtain the incoherent component for each of the plurality of scattered fields for the section.

7. The method of claim 4, wherein the normalized fluctuations of the incoherent scattered field are correlated across a range of frequencies of the excitation EM field and across the plurality of incident field directions and observed field directions, and wherein a distribution of power of the incoherent scattered field for the plurality of sections are independent of a density of rays representing the excitation EM field incident on the rough surface of the object for the EM field simulation.

8. The method of claim 1, wherein calculating the incoherent component for each of the plurality of scattered fields comprises:

computing normalized fluctuations of the incoherent component for each of the plurality of scattered fields observed at a far-field hemisphere based on the statistics of the plurality of recorded scattered fields;

selecting a center of a phase circle, wherein the phase circle represents a projection of the far-field hemisphere onto the rough surface;

translating the center of the phase circle to generate a translated phase circle to maintain correlations of the normalized fluctuations of the incoherent component for each of the plurality of scattered fields due to the excitation EM field at the incident direction;

selecting an ellipse centered at the translated phase circle, wherein the ellipse is selected based on a relative size of a projected ray-tube footprint to the rough surface used for obtaining the statistics of the plurality of recorded scattered field; and sampling the normalized fluctuations to correspond to a projection of the observation direction onto the ellipse to generate a phase of the incoherent component for each of the plurality of scattered fields due to the excitation EM field on the projected ray-tube footprint.

9. The method of claim 4, wherein the mean of the plurality of bistatic field measurements, the variance of the plurality of bistatic field measurements, and the normalized fluctuations of the incoherent scattered field comprise bidirectional scattering distribution functions (BSDFs) are used as lookup tables for calculating the coherent component and the incoherent component for each of the plurality of scattered fields observed at the observation direction.

10. The method of claim 2, further comprising:

modulating a coherent component of the GO approximation for a section of the rough surface by the mean of the plurality of recorded scattered fields associated with the incident direction of the excitation EM field for the section and the observation direction for each of the plurality of scattered fields to generate modulated coherent component of the GO approximation; and propagating the modulated coherent component of the GO approximation in accordance with a multi-bounce ray tracing model of a shooting and bouncing ray (SBR) framework.

11. A system, comprising:

a processor; and a memory coupled to the processor to store instructions, which when executed by the processor, cause the processor to perform operations, the operations comprising:

obtaining statistics of a plurality of recorded scattered fields due to incident electromagnetic (EM) fields on a rough surface of an object;

simulating a projection of an excitation EM field from a radiation source onto the rough surface of the object for a plurality of scattered fields, wherein a plurality of sections of the rough surface of the object comprises a plurality of projected ray-tube footprints formed by a corresponding volumetric ray-tube projected onto the rough surface of the object, and wherein the corresponding volumetric ray-tube transports the excitation EM field from the radiation source to the rough surface of the object;

calculating a coherent component and an incoherent component for each of the plurality of scattered fields from the rough surface based on the statistics of the plurality of recorded scattered fields, the coherent component and the incoherent component being scattered from a plurality of sections of the rough surface due to the excitation EM field incident on the rough surface at an incident direction;

generating an aggregate scattered field based on coherent components and incoherent components of the plurality of scattered fields, the aggregate scattered field representing a field scattered from the object due to the excitation EM field observed at an observation direction; and generating a synthetic-aperture-radar (SAR) imagery of the object at an antenna by processing the aggregate scattered field for each of the projected ray-tube footprints using shooting and bouncing rays (SBR) technique based on coherently accumulating the aggregate scattered field over the projected ray-tube footprints.

12. The system of claim 11, wherein the processor calculating the coherent component for each of the plurality of scattered fields comprises the processor:

computing a geometrical optics (GO) approximation based on the excitation EM field incident on a section of the rough surface;

computing a physical optics (PO) approximation of equivalent surface currents induced on the section based on the GO approximation;

computing a radiated coherent field based on the PO approximation of equivalent surface currents, with a constant magnitude and a linear phase progression across the section; and modulating the radiated coherent field based on a mean of the plurality of recorded scattered fields associated with the incident direction of the excitation EM field for the section and the observation direction to obtain the coherent component for each of the plurality of scattered fields.

13. The system of claim 11, wherein the processor calculating the incoherent component for each of the plurality of scattered fields comprises the processor:

computing a magnitude of the incoherent component for each of the plurality of scattered fields for a section of the rough surface based on a variance of the plurality of recorded scattered fields associated with the incident direction of the excitation EM field for the section and the observation direction for each of the plurality of scattered fields; and modulating the magnitude of the incoherent component with a phase based on normalized fluctuations of the incoherent component for each of the plurality of scattered fields computed from the plurality of recorded scattered fields associated with the incident direction of the excitation EM field for the section and the observation direction to obtain the incoherent component for each of the plurality of scattered fields.

14. The system of claim 11, wherein the statistics are computed from the plurality of recorded scattered fields due to the excitation EM field on the rough surface comprises the processor:

generating a plurality of instantiations of an explicit model to represent height fluctuations of the rough surface;

computing a plurality of bistatic field measurements as a function of a plurality of incident field polarizations and observed field polarizations across a plurality of incident field directions and observed field directions based on the plurality of instantiations of the explicit model;

computing a mean of the plurality of bistatic field measurements to model a magnitude of a coherent scattered field due to the incident EM fields, wherein the mean is computed for each of a plurality of combinations of the incident field polarizations, the observed field polarizations, the incident field directions, and the observed field directions;

computing a variance of the plurality of bistatic field measurements to model a magnitude of an incoherent scattered field due to the incident EM fields, wherein the variance is computed for each of the plurality of combinations of the incident field polarizations, the observed field polarizations, the incident field directions, and the observed field directions; and computing normalized fluctuations of the incoherent scattered field based on the bistatic field measurements to model a phase of the incoherent scattered field due to the incident EM fields, wherein the normalized fluctuations are computed for each of a plurality of combinations of the incident field directions and the observed field directions.

15. The system of claim 14, wherein the processor computing the normalized fluctuations of the incoherent scattered field for a given combination of an incident field direction and an observed field direction comprises the processor:

subtracting the mean of the plurality of bistatic field measurements for the given combination of the incident field direction and the observed field direction from one of the bistatic field measurements to obtain zero-mean fluctuations of the incoherent scattered field; and normalizing the zero-mean fluctuations of the incoherent scattered field by the variance of the plurality of bistatic field measurements for the given combination of the incident field direction and the observed field direction to obtain the normalized fluctuations of the incoherent scattered field for the given combination of the incident field direction and the observed field direction.

16. The system of claim 11, wherein the processor calculating the incoherent component for each of the plurality of scattered fields for one of the plurality of sections comprises the processor:

generating a plurality of randomly distributed complex numbers to represent a plurality of samples of the rough surface;

filtering the plurality of randomly distributed complex numbers by a filtering function to generate normalized fluctuations of the incoherent component for each of the plurality of scattered fields; and modulating a magnitude of the incoherent component for a section of the rough surface and the observation direction for each of the plurality of scattered fields with a phase based on the normalized fluctuations of the incoherent component for each of the plurality of scattered fields to obtain the incoherent component for each of the plurality of scattered fields for the section.

17. The system of claim 14, wherein the normalized fluctuations of the incoherent scattered field are correlated across a range of excitation frequencies of the EM fields and across the plurality of incident field directions and observed field directions, and wherein a distribution of power of the incoherent scattered field for the plurality of sections are independent of a density of rays representing the excitation EM field incident on the rough surface of the object for an EM field simulation.

18. The system of claim 11, wherein the processor calculating the incoherent component for each of the plurality of scattered fields comprises the processor:

computing normalized fluctuations of the component of the incoherent scattered field observed at a far-field hemisphere based on the statistics of the plurality of recorded scattered fields;

selecting a center of a phase circle, wherein the phase circle represents a projection of the far-field hemisphere onto the rough surface;

translating the center of the phase circle to generate a translated phase circle to maintain correlations of the normalized fluctuations of the component of the incoherent scattered field due to the excitation EM field at the incident direction;

selecting an ellipse centered at the translated center, wherein the ellipse is selected based on a relative size of a projected ray-tube footprint to the rough surface used for obtaining the statistics of the plurality of recorded scattered field; and sampling the normalized fluctuations to correspond to a projection of the observation direction onto the ellipse to generate a phase of the incoherent component for each of the plurality of scattered fields due to the excitation EM field on the projected ray-tube footprint.

19. The system of claim 14, wherein the mean of the plurality of bistatic field measurements, the variance of the plurality of bistatic field measurements, and the normalized fluctuations of the incoherent scattered field comprise bidirectional scattering distribution functions (BSDFs) are used as lookup tables for calculating the coherent component and the incoherent component for each of the plurality of scattered fields observed at the observation direction.

20. The system of claim 12, wherein the processor further performs operations comprising:

modulating a coherent component of the GO approximation for a section of the rough surface by the mean of the plurality of recorded scattered fields associated with the incident direction of the excitation EM field for the section and the observation direction for each of the plurality of scattered fields to generate modulated coherent component of the GO approximation; and propagating the modulated coherent component of the GO approximation in accordance with a multi-bounce ray tracing model of a shooting and bouncing ray (SBR) framework.

21. A non-transitory computer-readable medium having instructions stored therein, which when executed by a processor, cause the processor to perform operations, the operations comprising:

obtaining statistics of a plurality of recorded scattered fields due to incident electromagnetic (EM) fields on a rough surface of an object;

simulating a projection of an excitation EM field from a radiation source onto the rough surface of the object for a plurality of scattered fields, wherein a plurality of sections of the rough surface of the object comprises a plurality of projected ray-tube footprints formed by a corresponding volumetric ray-tube projected onto the rough surface of the object, and wherein the corresponding volumetric ray-tube transports the excitation EM field from the radiation source to the rough surface of the object;

calculating a coherent component and an incoherent component for each of the plurality of scattered fields from the rough surface based on the statistics of the plurality of recorded scattered fields, the coherent component and the incoherent component being scattered from a plurality of sections of the rough surface due to the EM field incident on the rough surface at an incident direction;

generating an aggregate scattered field based on coherent components and incoherent components of the plurality of scattered fields, the aggregate scattered field representing a field scattered from the object due to the excitation EM field observed at an observation direction; and generating a synthetic-aperture-radar (SAR) imagery of the object at an antenna by processing the aggregate scattered field for each of the projected ray-tube footprints using shooting and bouncing rays (SBR) technique based on coherently accumulating the aggregate scattered field over the projected ray-tube footprints.

22. The non-transitory computer-readable medium of claim 21, wherein the calculating the coherent component for each of the plurality of scattered fields comprises:

computing a geometrical optics (GO) approximation based on the excitation EM field incident on a section of the rough surface;

computing a physical optics (PO) approximation of equivalent surface currents induced on the section based on the GO approximation;

computing a radiated coherent field based on the PO approximation of equivalent surface currents, with a constant magnitude and a linear phase progression across the section; and modulating the radiated coherent field based on a mean of the plurality of recorded scattered fields associated with the incident direction of the excitation EM field and the observation direction to obtain the coherent component for each of the plurality of scattered fields.

23. The non-transitory computer-readable medium of claim 21, wherein the calculating the incoherent component for each of the plurality of scattered fields comprises:

computing a magnitude of the incoherent component for each of the plurality of scattered fields for a section of the rough surface based on a variance of the plurality of recorded scattered fields associated with the incident direction of the excitation EM field for the section and the observation direction for each of the plurality of scattered fields; and modulating the magnitude of the incoherent component with a phase based on normalized fluctuations of the incoherent component for each of the plurality of scattered fields computed from the plurality of recorded scattered fields associated with the incident direction of the excitation EM field for the section and the observation direction for each of the plurality of scattered fields to obtain the incoherent component for each of the plurality of scattered fields.

* * * * *